US009112963B2

(12) United States Patent
Yamazaki et al.

(10) Patent No.: US 9,112,963 B2
(45) Date of Patent: Aug. 18, 2015

(54) ELECTRONIC DEVICE AND METHOD OF USAGE THEREOF

(75) Inventors: Shunpei Yamazaki, Tokyo (JP); Jun Koyama, Kanagawa (JP); Mai Osada, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 1638 days.

(21) Appl. No.: 11/680,052

(22) Filed: Feb. 28, 2007

(65) Prior Publication Data
US 2007/0146333 A1    Jun. 28, 2007

Related U.S. Application Data

(63) Continuation of application No. 09/954,694, filed on Sep. 11, 2001, now abandoned.

(30) Foreign Application Priority Data

| Sep. 11, 2000 | (JP) | 2000-274526 |
| Sep. 14, 2000 | (JP) | 2000-280047 |
| Sep. 14, 2000 | (JP) | 2000-280835 |
| Oct. 20, 2000 | (JP) | 2000-320718 |

(51) Int. Cl.
G06F 3/023    (2006.01)
H04M 1/23    (2006.01)

(52) U.S. Cl.
CPC .................................... *H04M 1/23* (2013.01)

(58) Field of Classification Search
CPC ............ H01H 2221/07; H01H 2231/022; H01H 3/03547; G06F 3/03547; G06F 3/0238; G06F 3/0488; G06F 3/04886; H04M 1/22; G06K 15/02
USPC ............ 345/156–173, 76–77, 87, 92; 341/20, 341/22, 26
See application file for complete search history.

(56) References Cited

U.S. PATENT DOCUMENTS 4,022,993 A  *  5/1977  Shattuck .................... 200/314
4,345,248 A       8/1982  Togashi et al.
(Continued)

FOREIGN PATENT DOCUMENTS

| EP | 0 898 405 A2 | 2/1999 |
| EP | 1126709 A1 | 8/2001 |

(Continued)

OTHER PUBLICATIONS

Baldo et al.; "Very high-efficiency green organic light-emitting devices based on electrophosphorescence" *Applied Physics Letters*, vol. 75, No. 1; pp. 4-6; Jul. 5, 1999.

(Continued)

*Primary Examiner* — Robin Mishler
*Assistant Examiner* — Mansour M Said
(74) *Attorney, Agent, or Firm* — Fish & Richardson P.C.

(57) ABSTRACT

The number of operation keys is normally on the order of 12 to 20, corresponding to numeral keys and specialized keys, even for a portable telephone device capable of sending signals to, and receiving signals from, the Internet. In order to input Japanese language characters, including kanji, and specialized characters as data, a complex operation is necessary for switching the input mode. With the present invention, display devices are formed in operation keys for inputting information to electronic devices such as portable information terminals, typically portable telephone devices, and information terminals, typically personal computer or stationary telephone devices. A user is able to recognize the operation keys by characters, symbols, and numerals displayed in the operation keys by the display devices. The user is able to recognize the operation keys even in a dark location in accordance with the present invention.

11 Claims, 42 Drawing Sheets

(56) References Cited

U.S. PATENT DOCUMENTS

| | | | |
|---|---|---|---|
| 4,609,791 A * | 9/1986 | Abbat | 200/5 A |
| 4,952,761 A * | 8/1990 | Viebrantz | 200/513 |
| 5,491,507 A | 2/1996 | Umezawa et al. | |
| 5,515,045 A * | 5/1996 | Tak | 341/23 |
| 5,616,936 A | 4/1997 | Misawa | |
| 5,737,053 A * | 4/1998 | Yomogihara et al. | 349/149 |
| 5,867,149 A | 2/1999 | Jaeger | |
| 5,881,866 A * | 3/1999 | Miyajima et al. | 200/513 |
| 6,069,648 A | 5/2000 | Suso et al. | |
| 6,232,937 B1 | 5/2001 | Jacobsen | |
| 6,246,388 B1 | 6/2001 | Motegi | |
| 6,307,751 B1 * | 10/2001 | Bodony et al. | 361/749 |
| 6,396,924 B1 | 5/2002 | Suso et al. | |
| 6,476,796 B1 * | 11/2002 | Kuzunuki et al. | 345/173 |
| 6,518,958 B1 * | 2/2003 | Miyajima et al. | 345/173 |
| 6,774,872 B1 | 8/2004 | Kawada | |
| 6,784,874 B1 * | 8/2004 | Shimizu | 345/173 |
| 7,193,591 B2 * | 3/2007 | Yumoto | 345/82 |
| 7,489,777 B2 | 2/2009 | Yamazaki et al. | |
| 2001/0055384 A1 | 12/2001 | Yamazaki | |
| 2002/0030647 A1 * | 3/2002 | Hack et al. | 345/82 |
| 2002/0054030 A1 * | 5/2002 | Murphy | 345/173 |
| 2009/0270134 A1 | 10/2009 | Yamazaki et al. | |

FOREIGN PATENT DOCUMENTS

| | | |
|---|---|---|
| JP | 56085792 | 7/1981 |
| JP | 61007913 | 1/1986 |
| JP | 62082454 | 4/1987 |
| JP | 63075820 | 4/1988 |
| JP | 04-000622 A | 1/1992 |
| JP | 04-369027 A | 12/1992 |
| JP | 04352547 | 12/1992 |
| JP | 06-141306 A | 5/1994 |
| JP | 06-508455 | 9/1994 |
| JP | 07-121156 A | 5/1995 |
| JP | 8017283 | 1/1996 |
| JP | 09-44143 | 2/1997 |
| JP | 09-065436 A | 3/1997 |
| JP | 09-247734 A | 9/1997 |
| JP | 9321846 | 12/1997 |
| JP | 10-013288 A | 1/1998 |
| JP | 10-144172 | 5/1998 |
| JP | 10-247434 | 9/1998 |
| JP | 11-069214 A | 3/1999 |
| JP | 11146057 | 5/1999 |
| JP | 11-284700 A | 10/1999 |
| JP | 11329739 | 11/1999 |
| WO | WO-92/22864 | 12/1992 |
| WO | WO 94/19736 | 9/1994 |

OTHER PUBLICATIONS

Baldo, et al., "Highly Efficient Phosphorescent Emission from Organic Electroluminescent Devices", Nature vol. 395, Sep. 10, 1998, pp. 151-154.

Tsutsui, et al., "Electroluminescence in Organic Thin Films", Photochemical Processes in Organized Molecular Systems, 1991, pp. 437-450.

Tsutsui, et al., "High Quantum Efficiency in Organic Light-Emitting Devices with Iridium-Complex as a Triplet Emissive Center", Japanese Journal of Applied Physics, vol. 38, Part 2, No. 12B, Dec. 15, 1999, pp. L1502-L1504.

\* cited by examiner

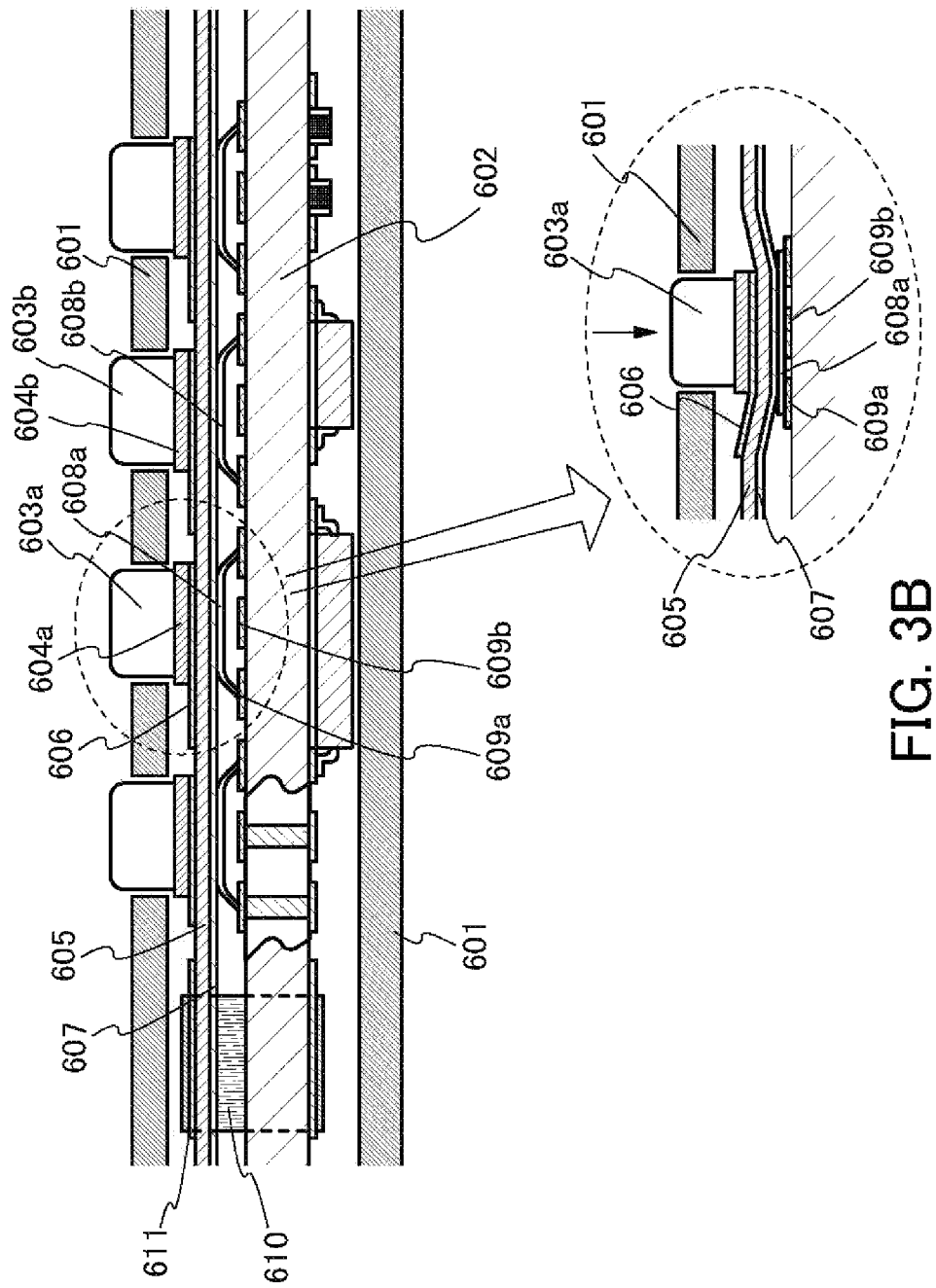

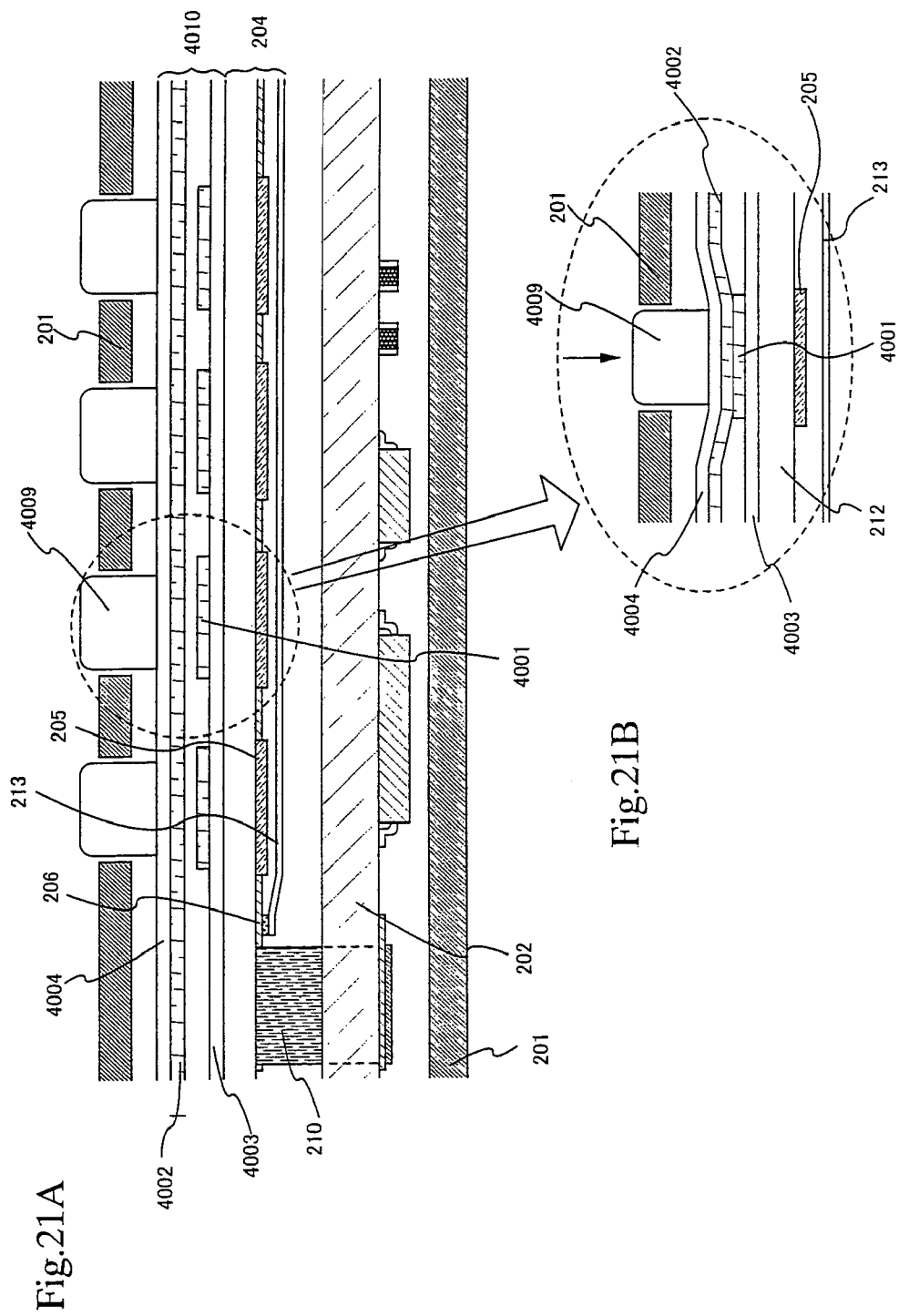

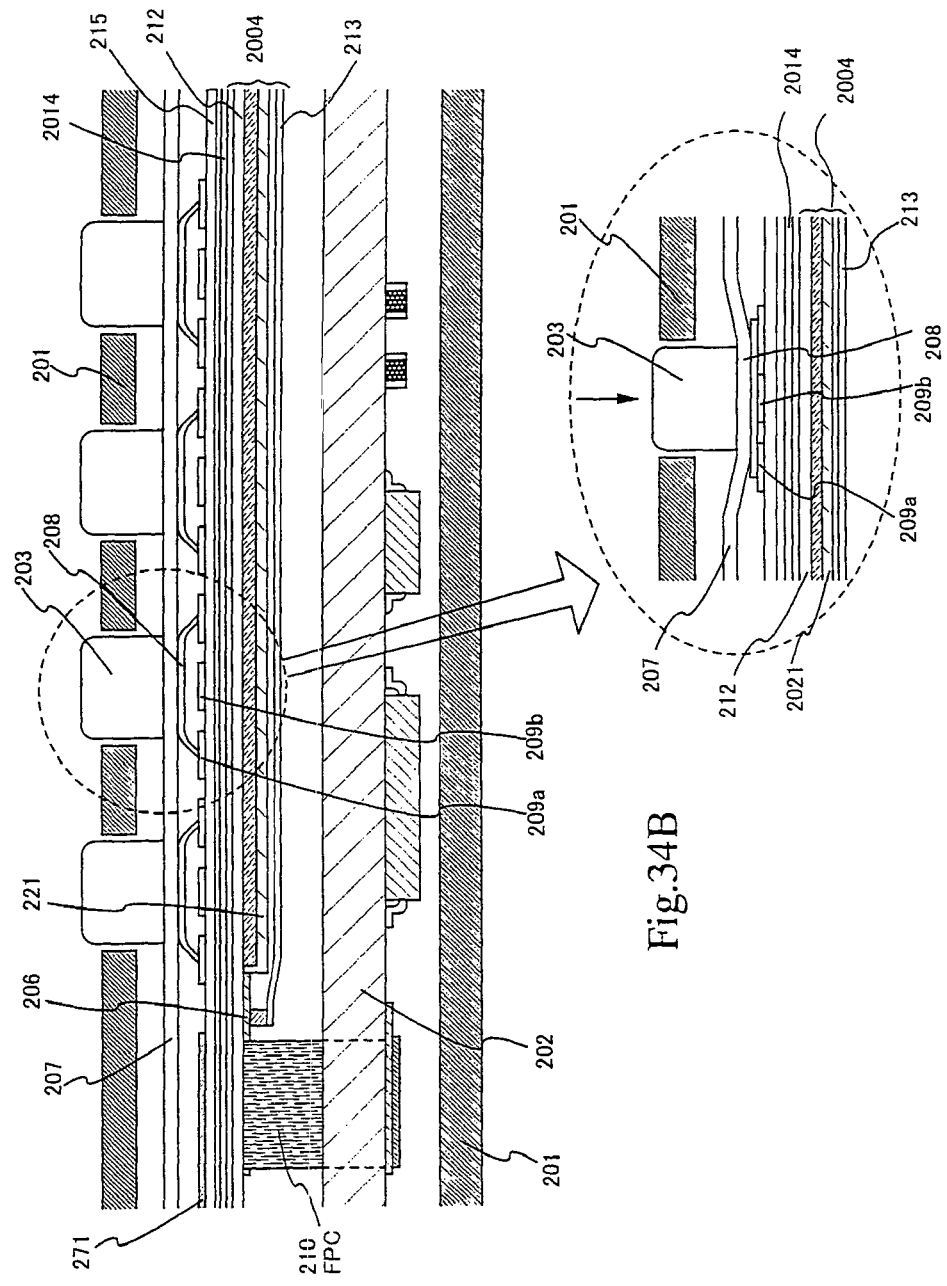
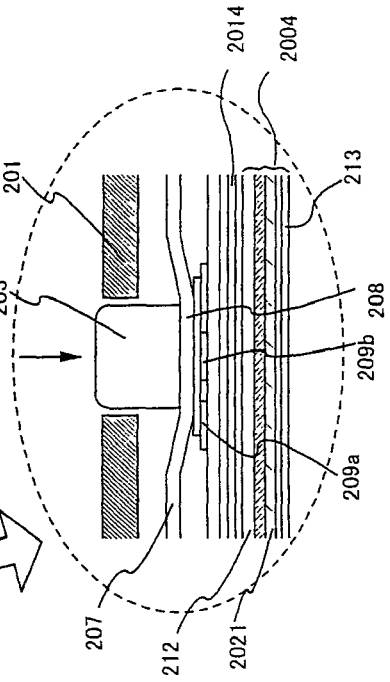
Fig.34A
Fig.34B pixel TFT portion | capacitance portion

ELECTRONIC DEVICE AND METHOD OF USAGE THEREOF

BACKGROUND OF THE INVENTION

1. Field of the Invention

The present invention relates to electronic devices including: information terminals such as stationary telephones, facsimiles, and personal computers; information terminals connected to the Internet and which transmit and receive information; and portable information terminals such as cellular telephones, PHS (personal handy phone system), and PDA (personal digital assistants). Note that, in this specification, the term portable information terminal indicates an electronic device which is capable of being carried by a user, and capable of sending and receiving data and information through a wireless telephone, a wire telephone, or the Internet, inside and outside of a structure.

2. Description of the Related Art

Information terminal electronic devices such as stationary telephones, facsimiles, and personal computers, and portable type electronic devices represented by typically portable telephone devices (referred to simply as cellular telephones), are spreading rapidly due to a combination of the establishment of information communication networks such as telephone lines, wireless communication lines, and the Internet, and the reduction in communication fees (or connection fees) and in price of electronic devices themselves, and the convenience. Electronic devices, spreading at present and functioning as information terminals and portable information terminals, are provided with a display device, a communication circuit, an MPU (microprocessor), a storage medium such as semiconductor memory, and input keys.

Portable electronic devices, typically cellular telephones, have come to be selected by users not only on their styling and function, but also on factors such as weight and length of continuous operation time. Various techniques for making the weight of portable electronic devices lighter and for lengthening time during which the electronic device can be used on a single charge, are therefore being concentrated upon. As a result, functionality thought to be unnecessary is being eliminated as much as possible.

Conventional communication lines, using stationary telephone devices, mainly for voice communication, often perform communication of a large amount of data containing image information due to the development of information communication networks as stated above, and due to the spread of information terminals. It is possible not only to send and receive data and electronic mail using personal computers, but also to send and receive electronic mail using portable telephone devices.

However, information terminals which are useful for the public such as stationary telephones and facsimiles, and portable electronic devices represented by typically portable telephone devices, are limited in their external design and external size, and thus functions thought to be unnecessary are eliminated as much as possible.

In electronic devices for which the portability is taken into account, such as portable telephone devices and PDAs, the number of input keys is normally about 12, corresponding to numerals and special keys. In order to input Japanese characters including Kanji and other special characters as data, it is necessary to perform complex operation with switching over input modes. It is therefore necessary to refer to an operation manual included with the electronic device, and the desired data cannot be smoothly input if the user forgets the method of operation.

SUMMARY OF THE INVENTION

In consideration of the above, an object of the present invention is to increase the convenience in a method of using an electronic device, in the case of inputting characters and numerals using input keys.

With the present invention, display devices are formed in input keys for inputting information into an electronic device such as a portable information terminal, typically a portable telephone device, or an information terminal, typically a personal computer or a stationary telephone device. A user is able to discern the input keys by characters, symbols, or numerals displayed by the display devices, and predetermined information is input to the electronic device in accordance with the image information displayed in the input keys. In accordance with this type of structure, the user can perform smooth input operations even if the number of input keys provided in the electronic device is made fewer. Further, the user can discern the operation keys even in a dark location.

EL display devices are preferably used as the display devices, and in addition, it is also possible to apply liquid crystal display devices. Note that, in this specification, the term EL display device indicates a display device in which a pixel portion is formed using a material with electro luminescence (hereafter referred to as EL).

Note also that electronic devices of the present invention may also function as telephones.

In addition, it is possible that the direction of a signal displayed in the pixel portion in each operation key be switched over corresponding to the vertical and horizontal direction of the electronic device. The ability of the electronic device to be used as desired can be made better in accordance with the above structure.

BRIEF DESCRIPTION OF THE DRAWINGS

In the accompanying drawings:

FIGS. 3A and 3B are diagrams for explaining a structure of an operation key of an electronic device in the present invention;

FIGS. 21A and 21B are diagrams for explaining structure a structure of operation keys of an electronic device in the present invention;

FIGS. 34A and 34B are diagrams for explaining a structure of operation keys of an electronic device in the present invention;

DETAILED DESCRIPTION OF THE PREFERRED EMBODIMENTS

[Embodiment Mode 1]

Figure 1:
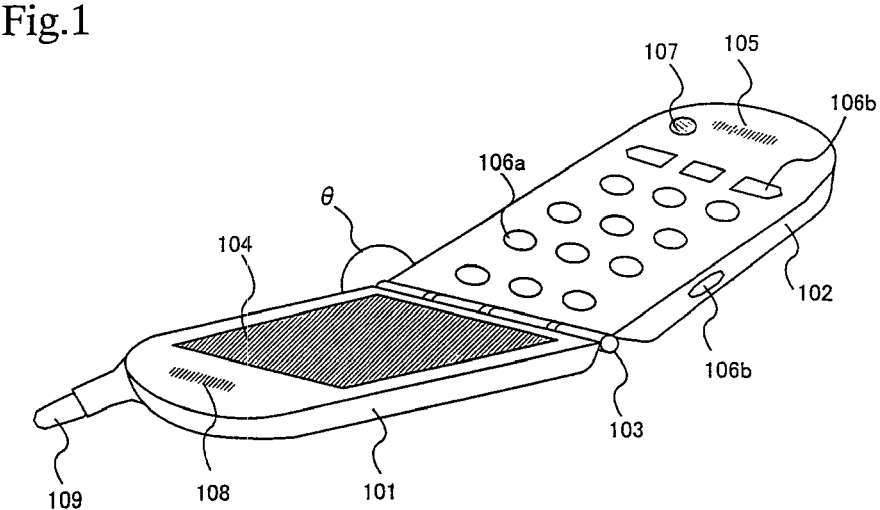
FIG. 1 is a diagram for explaining an example of a portable electronic device of the present invention.

Shown in FIG. 1 is an example of a portable telephone device which is capable of using the present invention. Reference numeral 101 denotes a first display panel which includes a display device, and reference numeral 102 denotes a second display panel provided with operation keys. The first display panel 101 and the second display panel 102 are connected by a connection portion 103 using a hinge. The angle è in the connection portion 103, between a surface on which display device 104 of the first display panel 101 is formed and a surface on which operation keys 106 of the second display panel 102 are formed, can be arbitrarily changed. An antenna 109 is stored in the first display panel 101, and it is possible to extend the antenna 109 out from the first display panel during use.

In addition to the display device 104, the first display panel 101 is also provided with an audio input portion 108 and the antenna 109. On the other hand, the second display panel 102 is provided with operation keys 106a, an input key 106b, an electric power source switch 107, and an audio output portion 105.

The operation keys 106a have a transparent button, and a display device formed inside a frame formed corresponding to each button. The display device has a pixel portion and a driver circuit (a source signal line driver circuit and a gate signal line driver circuit) for driving the pixel portion.

By placing the driver circuit, memory, and other circuits in portions between the operation keys, it is possible to arrange them without inviting an increase in the surface area of the display devices themselves.

Note that the term display device indicates an EL display device or a liquid crystal display device in this specification.

Further, a conversion key having a function for switching over image information is formed in the second display panel 102,it is possible for a user to change the image information displayed in the input key 106b by operating the conversion key.

Figures 2A, 2B:
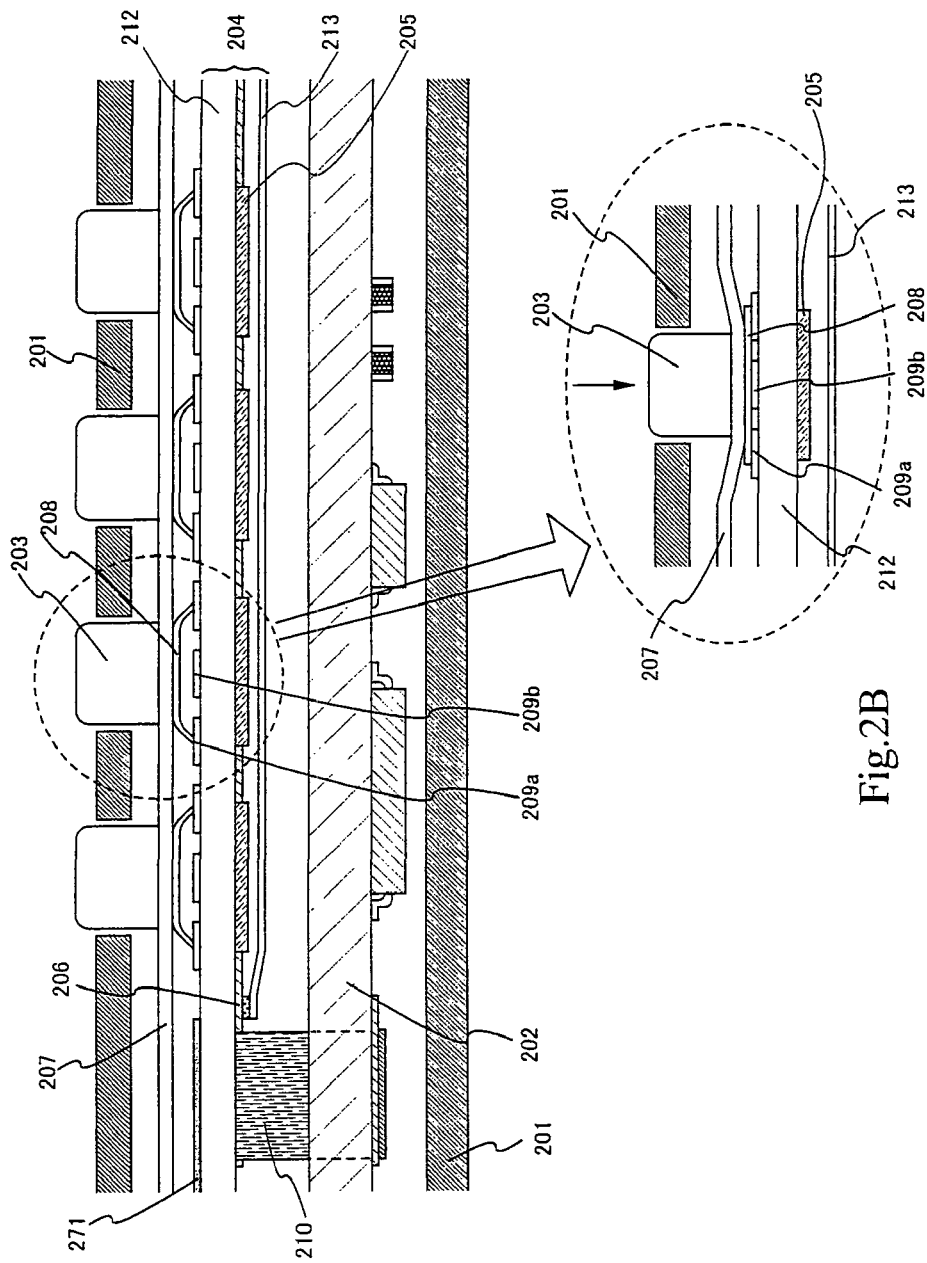
FIGS. 2A and 2B are diagrams for explaining a structure of an operation key of an electronic device in the present invention.

Signals displayed in the pixel portion of the display device can be recognized through the transparent buttons. FIGS. 2A and 2B are cross sectional diagrams for explaining a structure of operation keys of a portable telephone device or PDA which employs the present invention.

There is a printed substrate 202 formed of glass epoxy resin or a ceramic inside a frame 201 in FIG. 2A. A signal sending and receiving portion includes signal processing circuits such as a CPU (microprocessor), DSP (digital signal processor), various types of memory (flash memory or SRAM), a mixer, a frequency synthesizer, and the like as a base band portion.

An EL display device 204 is formed on the side of the printed substrate 202 that is opposite to the surface on which the above stated circuits are formed. The EL display device 204 has a substrate 212, a plurality of unit displays 205 formed on the substrate 212, and a cover material 213. The unit displays 205 are enclosed between the substrate 212 and the cover material 213.

Operation key buttons 203 which are capable of being recognized from the outside of the frame 201 are transparent, and the pixel portion with the unit displays 205 is formed in a portion underneath. Signals displayed in the unit displays 205 can thus be recognized through the button 203 in accordance with this structure.

The unit display 205 is connected to a wiring 206 formed on the substrate 212. Although there is no particular limitation on the connection form for the circuits the printed substrate 202 and the circuit of the substrate 212, the wiring 206 and the printed substrate 202 circuits may be connected using an FPC (flexible printed circuit) 210, for example.

Electrodes 209a and 209b, a diaphragm 208, and a flexible sheet 207 to which the diaphragm 208 is fixed, are formed. The diaphragm 208 is formed of an alloy containing aluminum or copper as its main constituent, and possesses conductivity. The diaphragm 208 is provided corresponding to the button 203. The electrodes 209a and 209b are connected to a circuit for sensing the key input, among the above stated circuits.

As shown in FIG. 2A, the diaphragm 208 is in contacts with only one of the electrodes, the electrode 209a, in a normal state. If the user pushes the button 203 in the direction of the arrow, the flexible sheet 207 and the diaphragm 208 both change their shapes, and the diaphragm 208 comes into a contact with both the electrode 209a and the electrode 209b to form a conduction, as shown in FIG. 2B. Input information is thus obtained by sensing whether or not the button is operated.

An example which is different from FIGS. 2A and 2B is explained next using FIGS. 3A and 3B.

There is a first printed substrate 602 formed of a glass epoxy resin or a ceramic inside a frame 601 in FIG. 3A, and various circuits are formed. A signal sending and receiving portion including signal processing circuits such as a CPU (microprocessor), DSP (digital signal processor), various types of memory (flash memory or SRAM), a mixer, a frequency synthesizer, and the like is formed as a base band portion in the other surface.

Operation key buttons 603a and 603b which are capable of being recognized from the outside of the frame 601 are transparent, and EL display devices 604a and 604b are provided under the operation keys buttons 603a and 603b. The EL display device 604a is fixed to a second printed substrate 605 with flexibility, and is connected to a circuit wiring 606 formed on the second printed substrate 605. There is no particular limitation on the connection form for the circuits of the first printed substrate 602 and the circuits of the second printed substrate 605, and they may be connected using an FPC (flexible printed circuit) 610, for example.

A flexible sheet 607, to which diaphragms 608a and 608b are fixed, is formed between the first printed substrate 602 and the second printed substrate 605. The diaphragms 608a and 608b are formed of an alloy containing aluminum or copper as their main constituent, and possess conductivity. The diaphragms 608a and 608b are formed corresponding to the buttons 603a and 603b. On the other hand, electrodes 609a and 609b are formed for each of the diaphragms 608a and 608b on the first printed substrate. The electrodes 609a and 609b are connected to a circuit for sensing the key input, among the above stated circuits.

As shown in FIG. 3A, the diaphragm 608a is in contact with only one of the electrodes, the electrode 609a, in a normal state. If the user pushes the button 603a in the direction of the arrow, the second printed substrate 605, the flexible sheet 607, and the diaphragm 608a all change their shape and the diaphragm 608a comes into contact with both the electrode 609a and the electrode 609b causing conduction, as shown in FIG. 3B. Input information is thus obtained by sensing whether or not the button is operated.

An example which is different from those of FIGS. 2A and 2B and FIGS. 3A and 3B, is explained next using FIGS. 4A and 4B.

Figures 4A, 4B:
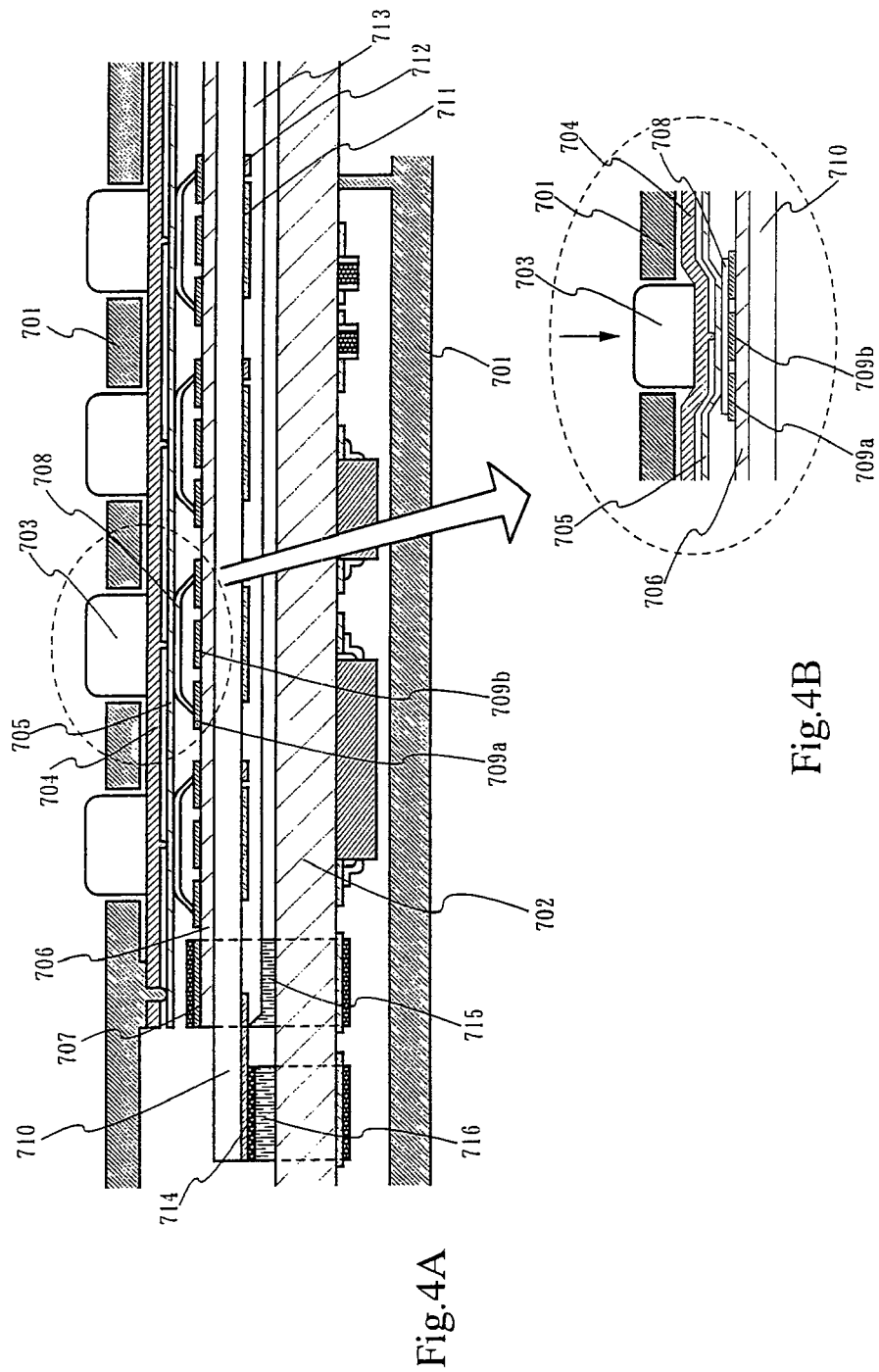
FIGS. 4A and 4B are diagrams for explaining a structure of an operation key of an electronic device in the present invention.

There is a first printed substrate 702 formed of a glass epoxy resin or a ceramic in a region surrounded by a frame 701 in FIG. 4A, and various circuits are formed. A signal sending and receiving portion including signal processing circuits such as a CPU (microprocessor), DSP (digital signal processor), various types of memory (flash memory or SRAM), a mixer, a frequency synthesizer, and the like is formed as a base band portion in the other surface.

Operation key buttons 703 which are capable of being recognized from the outside of the frame 701 are transparent, and fixed to a first flexible sheet 704 with transparency. In addition, a second flexible sheet 705 with transparency, to which a diaphragm 708 is fixed, is provided. The diaphragm 708 is arranged to correspond to the position of the transparent operation key 703, and the surface of an organic resin material with transparency and flexibility is covered by a transparent conductive material such as ITO (indium tin oxide alloy).

A second printed substrate 706, on which electrodes (co-planar electrodes) 709a and 709b are formed corresponding to the diaphragm position, are provided under the second flexible sheet 705. The second printed substrate 706 is also formed of a transparent material, and the co-planar electrodes 709a and 709b are formed of a transparent conductive film.

An EL display device 710 is formed in a portion underneath. In the EL display device 710, a pixel portion 711 is formed on the transparent substrate corresponding to the position of the transparent button 703, and a driver circuit 712 is formed in the periphery of the pixel portion. EL elements are weak with respect to humidity, and therefore a sealing material 713 is used to seal the EL element. There is no particular limitation on the connection form for the EL display device 710 and the first printed substrate 702, and they may be connected using an FPC 716 in an input terminal portion of the EL display device 710, for example. As another connection means, a spring probe of the first printed substrate 702 may also be provided, and a contact may be formed mechanically with an input terminal 714. Further, connection of the first printed substrate 702 and the second printed substrate 706 can similarly be formed using an FPC 715 in an output terminal portion.

As shown in FIG. 4A, the diaphragm 708 is in contacts with only one of the electrodes, the electrode 709a, in a normal state. If the user pushes the button 703 in the direction of the arrow, the first flexible sheet 704, the second flexible sheet 705, and the diaphragm 708 all change their shape and the diaphragm 708 comes into contacts with both the electrode 709a and the electrode 709b causing conduction, as shown in FIG. 4B. Input information is thus obtained by sensing whether or not the button is operated.

Embodiment Mode 2]

Figure 5:
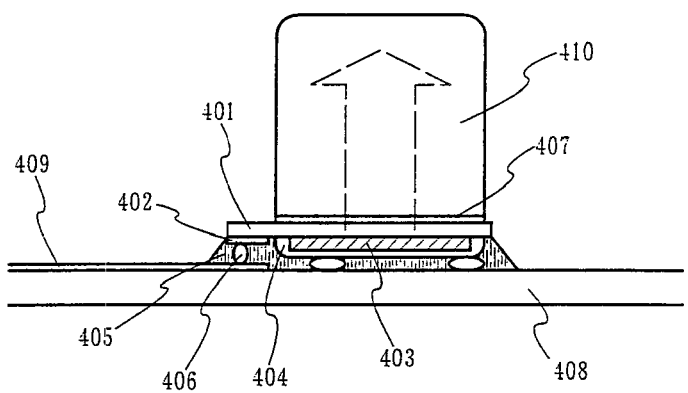
FIG. 5 is a diagram for explaining a structure of an operation key of an electronic device in the present invention.

Connection of an EL display device and transparent keys, and printed substrates, is explained in Embodiment Mode 2 using FIG. 5. In the EL display device, a pixel portion 403, a protective film 404, and an input terminal 402 are formed on a substrate 401, and are fixed to a printed substrate 408 by a hardening resin 405. Electrical connection of the input terminal 402 with a wiring 409 formed on the printed substrate 408, is formed through conductive particles 406 distributed in the hardening resin 405. Further, the substrate 401 and a transparent button 410 are also fixed by using an adhesive 407.

A plurality of input keys each composed of the transparent button 410 and the EL display device are arranged. An electronic device with an input means of the present invention is provided with function keys and the input keys, and display of Hinayana or display of numerals can be freely selected by user's operation.

Figure 6:
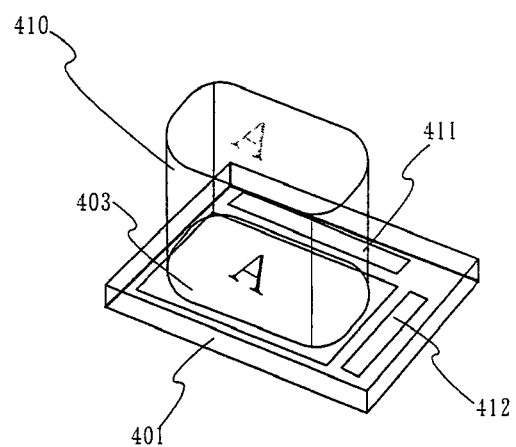
FIG. 6 is a perspective diagram of an operation key of an electronic device in the present invention.

FIG. 6 is a perspective view diagram for explaining the structure of this type of input key, and the EL display device is formed in a portion underneath the transparent button 410.

It is possible for the EL display device used here to be either a simple matrix type or an active matrix type.

Preferably, an active matrix drive EL display device, which has the pixel portion 403 and driver circuits 411 and 412 for driving the pixel portion formed on the substrate 401, is applied. The pixel portion of the active matrix drive EL display device is provided with EL elements, switching TFTs, and EL driver TFTs. Although it is necessary to have a 2 to 10 V driving voltage for the EL elements, it is possible to apply an effective means of forming light emitting layers of the EL elements with materials containing triplet excitation compounds in order to increase the light emitting efficiency and to reduce the electric power consumption. Characters displayed by the EL display device can be recognized through the transparent buttons 410 in accordance with this type of structure.

Figure 7:
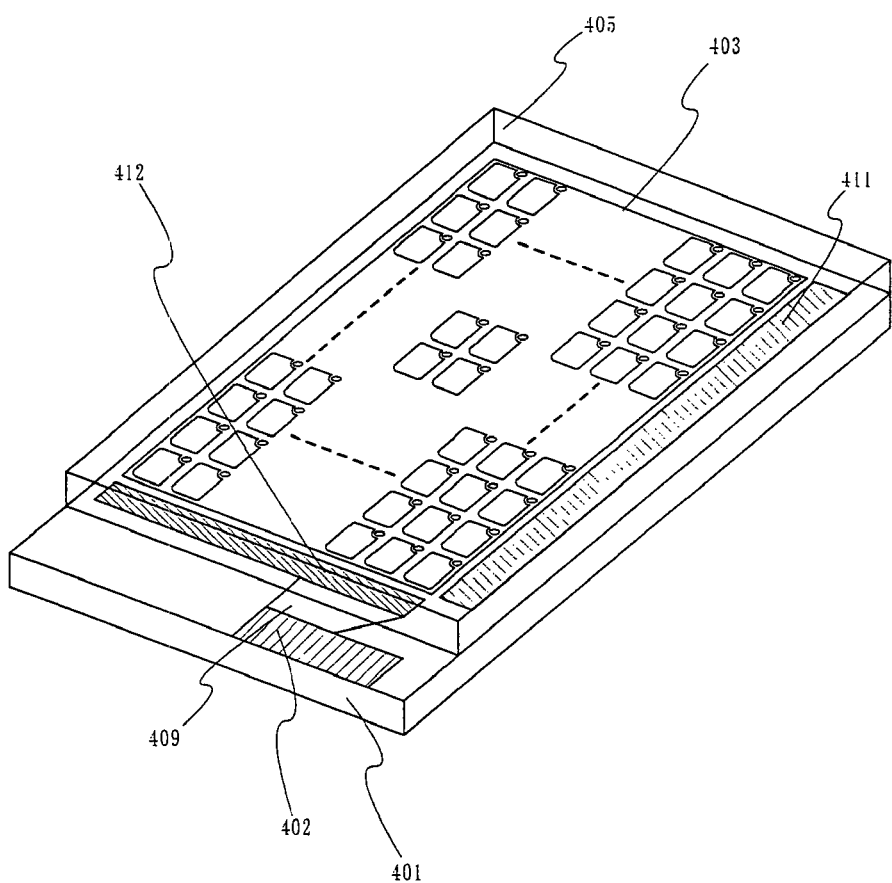
FIG. 7 is a diagram for explaining a structure of a display device.

FIG. 7 is a diagram showing an external view of an EL display device. In the EL display device, light emission of an EL element in each pixel is controlled separately and predetermined character patterns are formed to display image information. The EL display device shown in FIG. 7 has the structure, in which the substrate 401 on which the driver circuit portions 411 and 412, and the pixel portion are formed using TFTs is sealed by the sealing material 405. An FPC (flexible printed circuit) is connected to the edge of the substrate (element substrate) 401 at which an input terminal 402 are formed. In the input terminal 402, terminals for inputting image data signals, various types of timing signals, and an electric power source, from the outside the circuit are formed at a pitch of 500 μm, then are connected to the driver circuit portions by the wirings 409. The number of necessary pixels for displaying information such as characters and symbols may be arbitrarily set, and 10×10 to 20×20 pixels may be formed, preferably on the order of 15×15 pixels.

Figure 8:
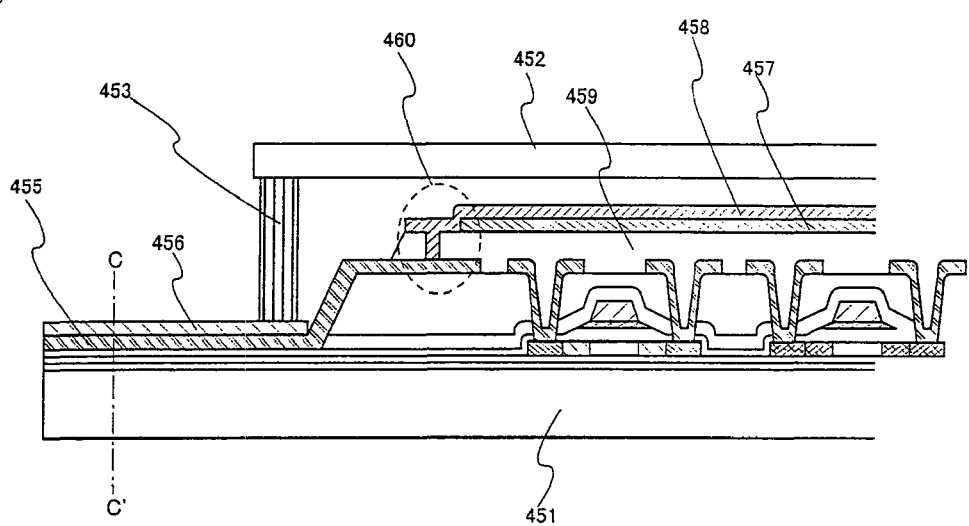
FIG. 8 is a diagram for explaining an input terminal portion of a display device.
Figure 9:
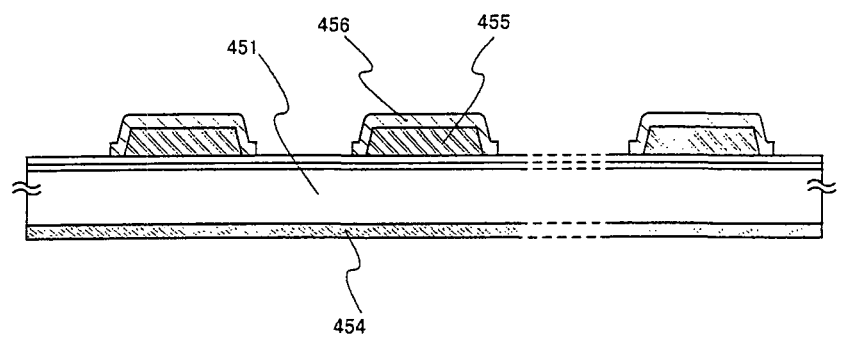
FIG. 9 is a diagram for explaining an input terminal portion of a display device.

There is no limitation on the structure of the input terminal, and it may be formed by laminating a wiring 455 of titanium (Ti) and aluminum (Al), and an ITO film 456 formed as an anode, as shown in FIG. 8. FIG. 9 shows a cross sectional diagram corresponding to the line C-C' in the input terminal portion. An element substrate 451 and a sealing substrate 452 are joined by a sealing material 453. An EL layer 457 and a cathode 458 are formed on a bank 459 in the driver circuit portion, and a contact portion 460 as shown in the figure is formed in order to make the cathode 458 contact the wiring.

Figure 10A:
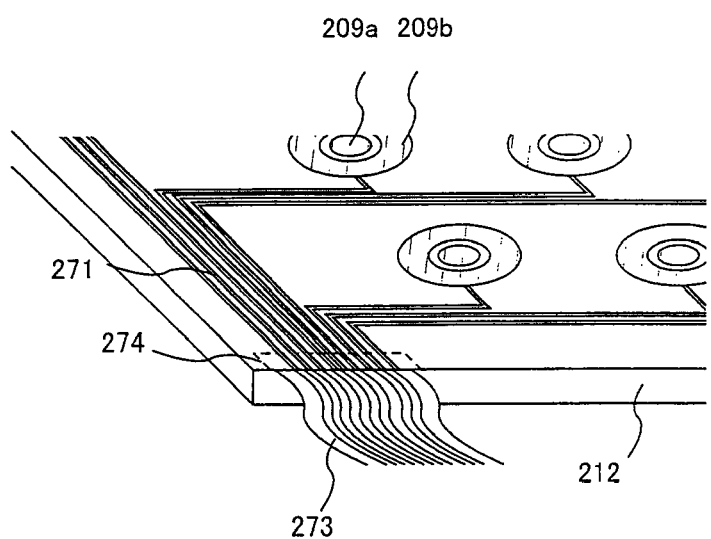
FIGS. 10A and 10B are diagrams showing connection structures of extraction wirings.
Figure 10B:
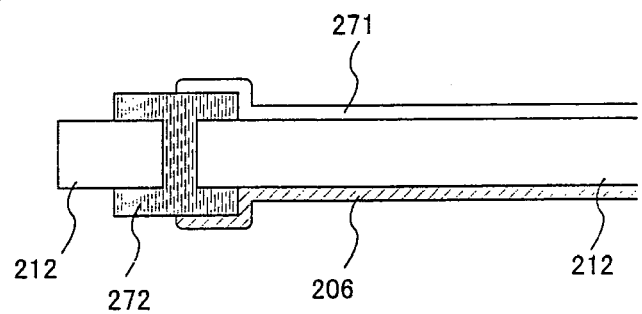

A connection structure of the electrodes 209a and 209b shown in FIGS. 2A and 2B is explained next using FIGS. 10A and 10B. The electrode 209b is connected to an extraction wiring 271, and the extraction wiring 271 is connected to an FPC 273 in a connection portion 274, as shown in FIG. 10A. The FPC 273 is connected to the circuits formed on the printed substrate 202. Note that it is not always necessary to form connections using an FPC, and that it is also possible to use connectors except FPCs.

Further, the extraction wiring 271 and the wiring 206 may also be made electrically conductive with each other by forming a contact hole in the substrate 212 and using a connection wiring 272.

Note that it is possible to freely combine Embodiment Mode 2 with Embodiment Mode 1.
Embodiments
[Embodiment 1]

Figure 11:
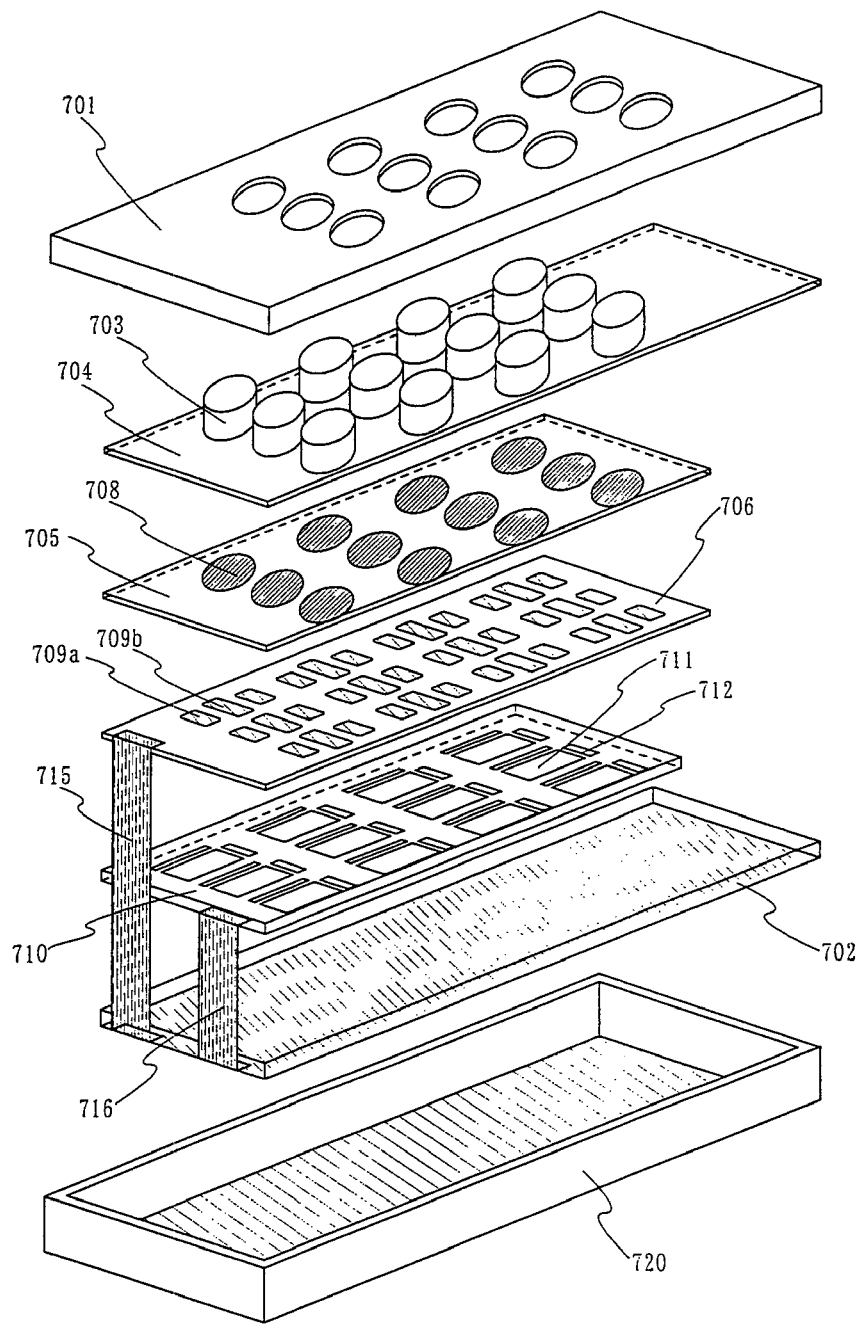
FIG. 11 is an assembly diagram of an electronic device of the present invention.

FIG. 11 shows an assembly diagram of the electronic device shown in FIG. 4, and for convenience, shown using the same reference symbols. Image information displayed by a pixel portion of an EL display device can be recognized by a user through the second printed substrate 706, the coplaner electrodes 709a and 709b, the diaphragm 708, the second flexible sheet 705, the first flexible sheet 704, and the transparent keys. With forming all of the above by using transparent materials, the light emitted by the pixel portion of the EL display device passes through and it becomes possible to discern the light from the outside of the electronic device.

In an electronic device with this type of structure, the user recognizes image information such as characters, numerals, and symbols displayed by the EL display device through the transparent keys, and predetermined information can be input to the electronic device in accordance with the image information displayed in the input keys. Provided that there is means for the user to intentionally switch the image information displayed by the EL display device, it becomes possible to input a lot of information smoothly into the electronic device and to store the information in a recording medium prepared in the electronic device.

Note that it is possible to freely combine embodiment 1 with Embodiment Modes 1 and 2.
[Embodiment 2]

Figure 12:
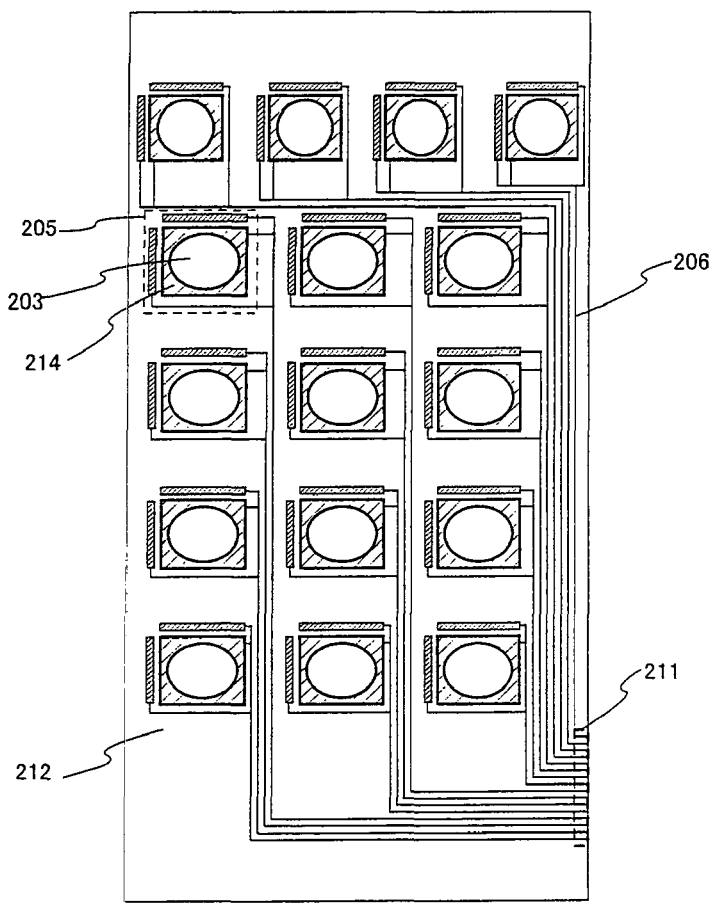
FIG. 12 is a diagram for explaining a structure of a pixel portion and a driver circuit of a display device.

FIG. 12 is an upper surface diagram of the substrate 212 on which the buttons 203, the unit displays 205, and the wirings 206 shown in FIGS. 2A and 2B are formed. Connection terminals 211 are formed in an edge portion of the substrate 212.

Figure 13:
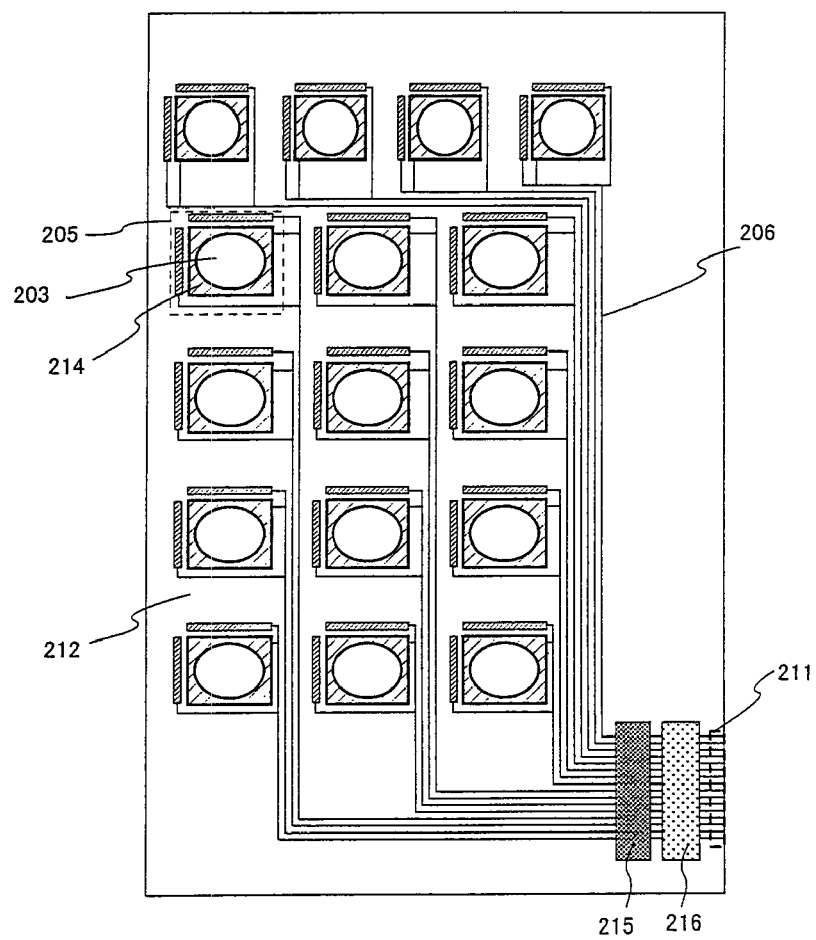
FIG. 13 is a diagram for explaining a structure of a pixel portion and a driver circuit of a display device.

Note that the controller and memory formed on the printed substrate 202 may also be formed on the substrate 212. An upper surface diagram of the substrate 212, in the case where the controller and the memory are formed on the substrate 212, is shown in FIG. 13.

Portions also shown in FIG. 12 have the same reference symbols. The wirings 206 are connected to a controller 215. The controller 215 generates clock signals (CLK) and start pulses (SP) used in driving the driver circuits of the unit displays 205. Further, image information of signals stored in a memory 216 is read out, and then input to a source signal line driver circuit of each unit display.

Note that the memory 216 may also be formed in each of the unit displays.

Figure 14:
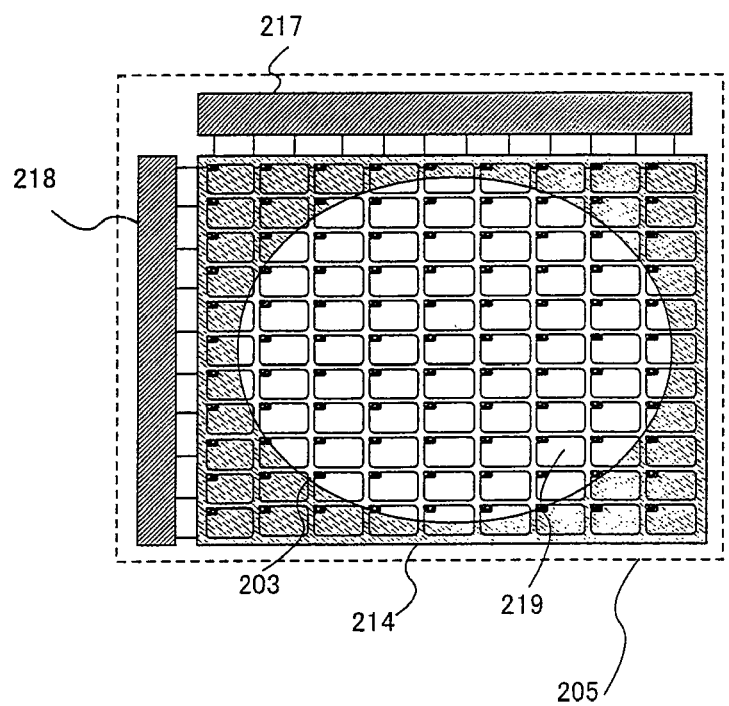
FIG. 14 is a diagram for explaining a structure of a unit display.

An upper surface diagram of the unit display 205 is shown in FIG. 14.

The unit display 205 has a pixel portion 214, a source signal line driver circuit 217, and a gate signal line driver circuit 218. The transparent button 203 is formed over the pixel portion 214. The pixel portion 214 has a plurality of pixels 219, and each of the pixels 219 has an EL element (not shown in the figures) and a TFT (not shown in the figures).

Figure 15:
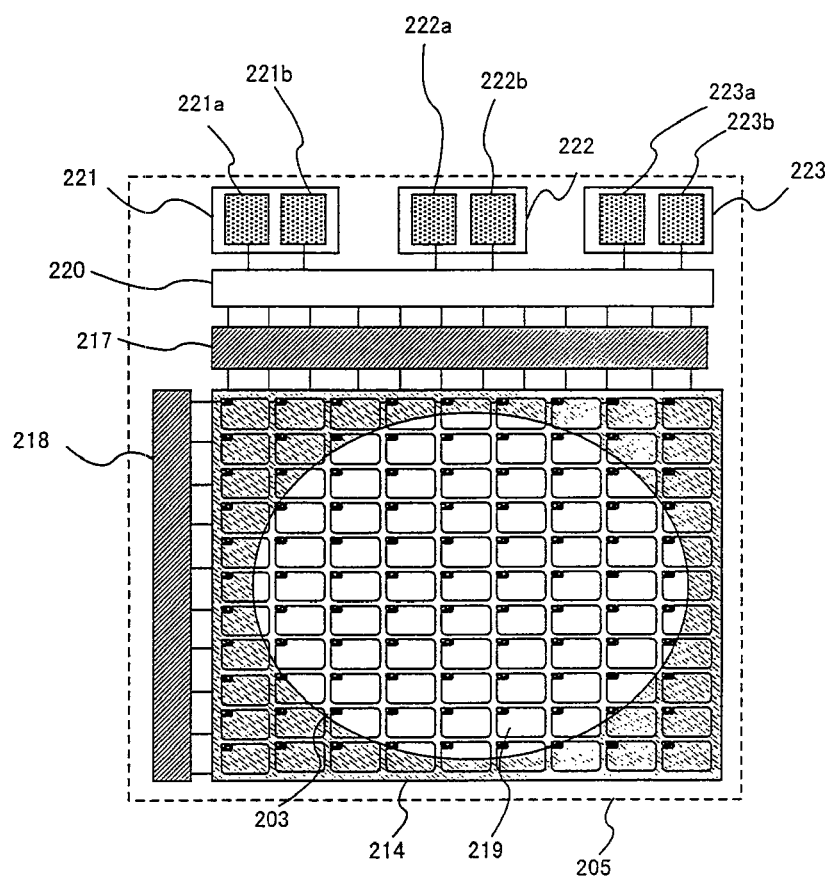
FIG. 15 is a diagram for explaining a structure of a unit display.

Note that there may also be a structure in which the memory is formed for every unit display. FIG. 15 shows an upper surface diagram of a unit display in which memory is formed. Portions also shown in FIG. 14 have the same reference symbols.

The unit display 205 shown in FIG. 15 has three memories. Note that the number of memories formed per unit display is not limited to three. It is possible for a designer to appropriately set the number of memories.

The unit display shown in FIG. 15 has a first memory 221, a second memory 222, a third memory 223, and a selection circuit 220 for reading out signal image information from the first to the third memories. Numeral image information is stored in the first memory 221, Japanese kana image information is stored in the second memory 222, and alphabet image information is stored in the memory 223.

The first memory 221 has a vertical display first memory 221a and a horizontal display first memory 221b. Vertical direction numeral image information is stored in the vertical display first memory 221*a,* and horizontal direction numeral image information is stored in the horizontal display first memory 221*b.*

The second memory 222 has a vertical display second memory 222*a* and a horizontal display second memory 222*b.* Vertical direction Japanese kana image information is stored in the vertical display second memory 222*a,* and horizontal direction Japanese kana image information is stored in the horizontal display second memory 222*b.*

The third memory 223 has a vertical display third memory 223*a* and a horizontal display third memory 223*b.* Vertical direction alphabet image information is stored in the vertical display third memory 223*a,* and horizontal direction alphabet image information is stored in the horizontal display third memory 223*b.*

For example, vertical direction numeral image information is read out from the vertical display first memory 221*a* by the selection circuit 220, and is then input to the source signal line driver circuit 217, in a case of displaying numerals vertically in the display portion 214.

Note that it is not always necessary for only one signal to be displayed in the pixel portion 214. A plurality of signal image information may also be displayed in one pixel portion 214 so that a plurality of signals are displayed in the pixel portion 214.

Note also that, although an electronic device, in which a plurality of unit displays are formed, is explained in embodiment 2, the present invention is not limited to such. For example, only one display may be formed, and the display may be recognized through holes for the buttons provided in the frame in that case.

Figure 16:
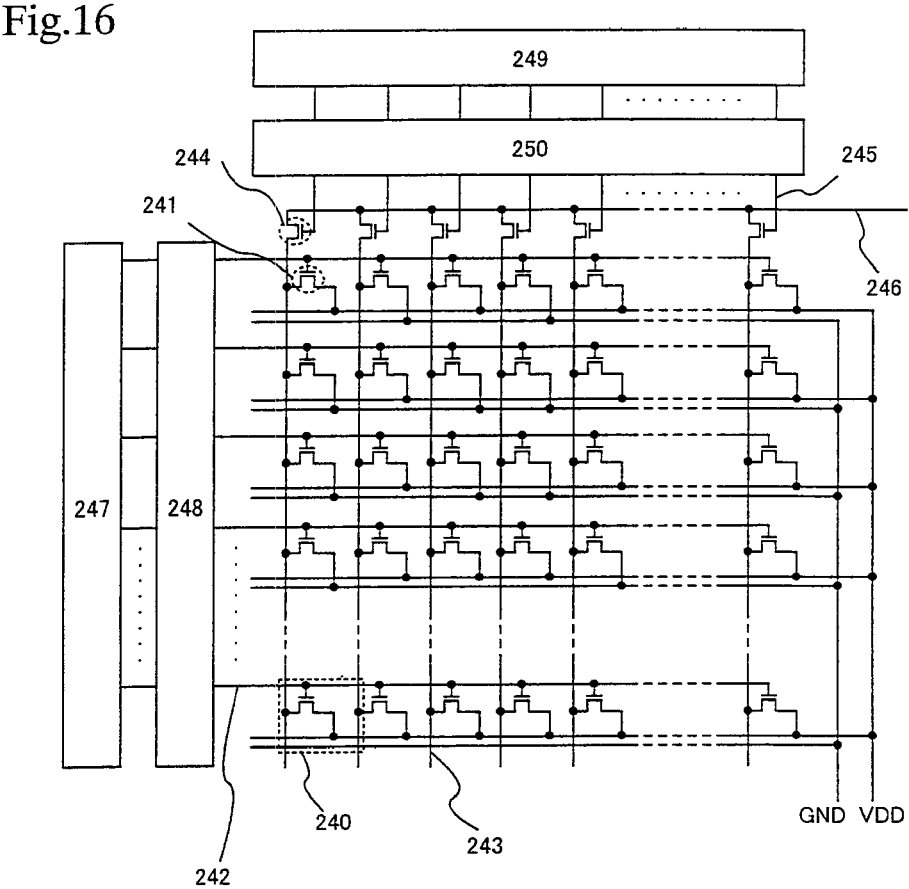
FIG. 16 is a diagram for explaining a structure of a mask ROM.

The first to the third memories may be flash memories, and they may also be mask ROMs. A mask ROM structure used in the memories of the unit display 205 is shown in FIG. 16.

The mask ROM has a plurality of addresses 204 provided in a matrix shape, and a selection TFT 241 is formed in each of the addresses 240. A gate electrode of the selection TFT 241 is connected to a scanning line 242. One of a source region and a drain region of the selection TFT 241 is connected to a read out wiring 243, and the other is connected to one of two electric power sources.

One of the two electric power sources is a high voltage side voltage (VDD), and the other is a low voltage side voltage (GND). The electric power source, to which the selection TFT 241 is connected in each address 240, is determined by the image information of the memory.

A data read out TFT 244 has a gate electrode connected to a selection line 245. One of a source region and a drain region of the data read out TFT 244 is connected to the read out wiring 243, and the other is connected to an output wiring 246.

A selection timing signal output from a selection shift register 247 is amplified in a selection buffer 248, and is then input to each scanning line 242. The selection TFTs 241 whose gate electrodes are connected to the scanning line 242 are turned on in accordance with the selection timing signal, and the electric power source (GND or VDD) is made conductive to the read out wiring 243.

Next, a read out timing signal output from a read out shift register 249 is amplified in a read out buffer 250, and is then input to each scanning line 245. The data read out TFTs 244 whose gate electrodes are connected to the selection lines 245 are turned on in order, and, the electric potential of the electric power source (GND or VDD) is input to the output wirings 246 through the read out wirings 243.

The image information of the memory can be read out by performing the above operations in all of the addresses 240.

Figure 17:
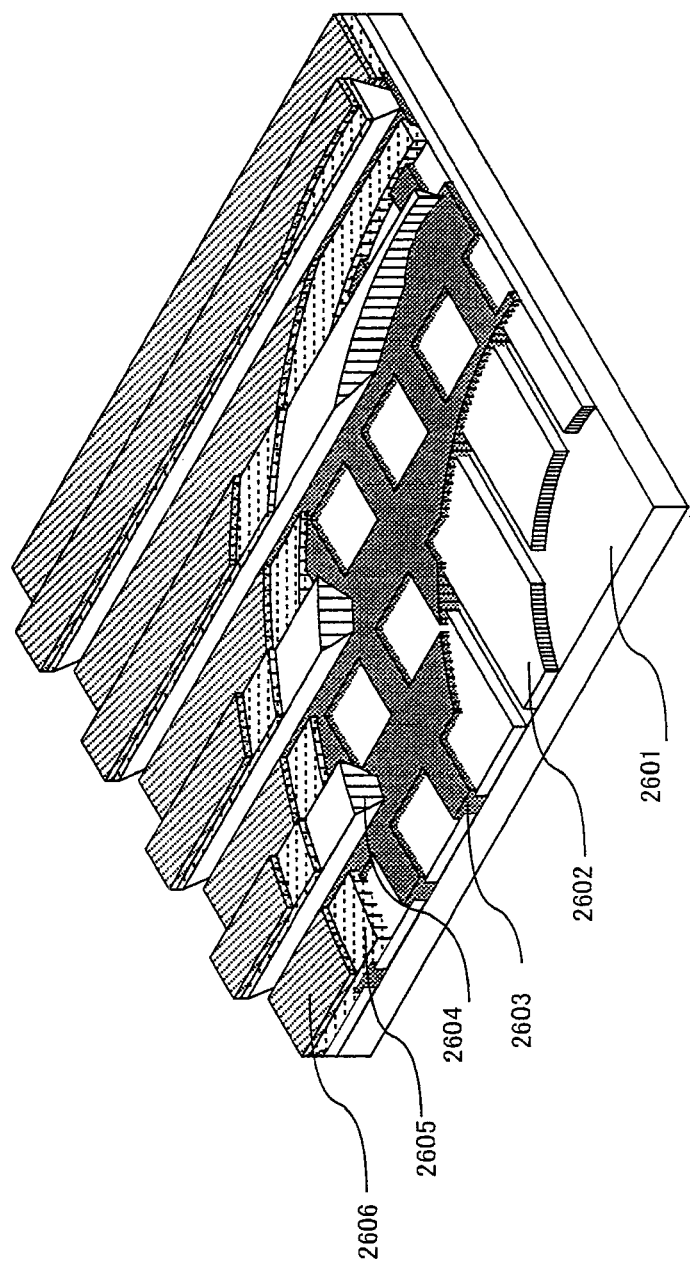
FIG. 17 is a diagram for explaining a structure of a unit display.

An example of a structure of a pixel portion of a simple matrix type unit display used in the present invention is shown in FIG. 17.

Anodes 2602 are formed as lined up rectangularly on a substrate 2601. An insulating film 2603 is then formed in a matrix shape to cover the substrate 2601 and the anodes 2602. Banks 2604 are then formed on the insulating film 2603 in order to separate adjacent EL layers and anodes.

It is preferable to form the banks 2604 using an insulating material in order to also electrically separate the adjacent EL layers and anodes.

EL layers 2605 and cathodes 2606 are laminated and formed in order on a passive substrate with the substrate 2601, the anodes 2602, the insulating layer 2603, and the banks 2604. Adjacent EL layers 2605 and cathodes 2606 are sandwiched by the banks 2604 and are separated by the banks 2604. Known materials may be used for the EL layers 2605, and materials such as ZnS:Mn, CdSSe, and SrS may be used.

Both low molecular weight (monomer) materials and high molecular weight (polymer) materials exist as organic EL materials, and either may be used. An evaporation method is used if low molecular weight materials are employed, and a method such as spin coating, printing, or ink jet printing is used in cases of utilizing high molecular weight materials. As one example of a low molecular weight organic EL material, a copper phthalocyanine (CuPc) film is formed with a thickness of 20 nm as a hole injecting layer, and a tris-8-aluminum quinolinolate complex (Alq$_3$) film is formed with a thickness of 70 nm as a light emitting layer on the CuPc film, to form a lamination structure. The color of emitted light can be controlled by adding a fluorescent pigment such as quinacridon, perylene, or DCM1 to Alq$_3$.

However, the above example is only one example of a low molecular weight organic EL material which can be used as the EL layer, and there is no limitation on the materials used. EL layers (layers for performing light emission and movement of carriers for the light emission) may be formed by freely combining light emitting layers, charge transporting layers, and charge injecting layers. For example, it is possible to use an inorganic material such as silicon carbide as a charge transporting layer or a charge injecting layer.

π-conjugate polymers and the like are known as high molecular weight EL materials. The following can be given as typical examples: polyparaphenylene vinylenes (PPVs), polyvinyl carbazoles (PVKs), and polyfluorenes. EL layers formed using these types of materials may use single layer or lamination structures, and the use of lamination structures has better light emission efficiency. In general, a hole injecting layer, a hole transporting layer, a light emitting layer, and an electron transporting layer are formed in order on the anode. However, a structure in which a hole transporting layer, a light emitting layer, and an electron transporting layer are formed, or a structure in which a hole injecting layer, a hole transporting layer, a light emitting layer, an electron transporting layer, and an electron injecting layer are formed may also be used. All known structure may be used in the present invention, and doping of fluorescent pigments and the like may also be performed into the EL layers.

with respect to color display, there are roughly divided into four methods: a method of forming three types of EL elements corresponding to R (red), G (green), and B (blue); a method of combining white light emitting EL elements with color filters; a method of combining blue color or blue green color light emitting EL elements with fluorescent (fluorescent color changing layers: CCM); and a method of using transparent electrodes as the cathodes (opposing electrodes) and overlapping EL elements corresponding to RGB.

As a specific EL layer, cyano-polyphenylene may be used as a red color light emitting EL layer, polyphenylene vinylene may be used as a green color light emitting EL layer, and polyphenylene-vinylene or polyalkyl-phenylene may be used as a blue light emitting EL layer. The thickness of the EL layers may be set from 30 to 150 nm.

The above example is one example of organic EL materials which can be used as EL layers, and there is no limitation on materials. Materials for forming light emitting layers, charge transporting layers, and charge injecting layers can be freely selected in possible combinations. The EL layers shown in embodiment 2 have a structure in which a light emitting layer, and a hole injecting layer of PEDOT (polyphenylene) or PAni (polyaniline) are formed.

The method of manufacture for a simple matrix is simple compared to an active matrix, and its cost is also low. It is therefore possible to reduce the cost of a portable information terminal itself.

Note that it is possible to freely combine embodiment 2 with Embodiment Modes 1 and 2, and with embodiment 1.

[Embodiment 3]

Figure 18:
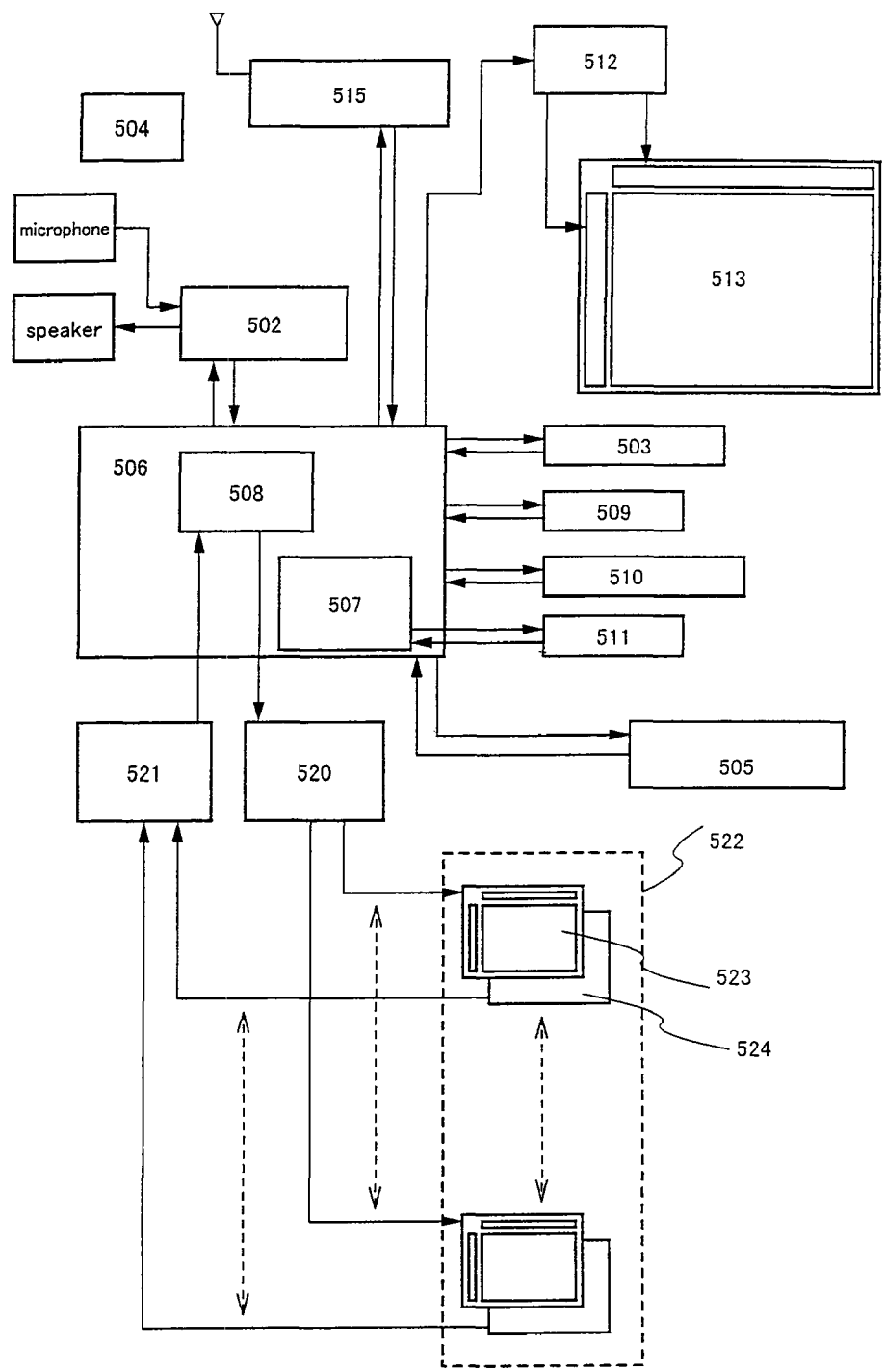
FIG. 18 is a block diagram for explaining a structure of an electronic device of the present invention.

FIG. 18 shows a block diagram for explaining a structure of an electronic device of the present invention. A unit display 523 and a key input sensing portion 524 are prepared in an input key portion 522 in a system shown in FIG. 18. A keyboard interface portion 508 of a CPU 506 control, through a keyboard controller circuit 520, image signals displayed by the unit display 523.

Further, signals from the key input sensing portion 524 are input to the keyboard interface portion 508 through an input signal processing circuit 521, data processing is performed by an interior portion of the CPU 506, predetermined information is output to a controller circuit 512, and the image information is displayed in a display device 513 or transferred.

Other external circuits include an electric power source 504 composed of a stabilized electric power source and a high speed and high precision op-amp, an audio processing circuit 502, an external interface port 505, and a sending and receiving circuit. Further, an image signal processing portion 507 is built in to the CPU 506. A VRAM 511, a DRAM 509, a flash memory 510, and a memory card 503 are connected to the CPU 506. Information processed by the CPU 506 is output as image signals (data signals) from the image signal processing portion 507 to the controller circuit 512. The controller circuit 512 supplies the image signals and clock signals to the display device 513. Specifically, the controller circuit has a function for dividing the image signals into data corresponding to each pixel, and a function for converting horizontal synchronization signals and vertical synchronization signals, which are input from the outside, into driver circuit start signals and into alternating current timing control signals for the internal electric power source circuit.

In the electronic device of the present invention, the CPU intensively manages to control the display devices provided in the operation keys, as shown in FIG. 18.

Figure 19A:
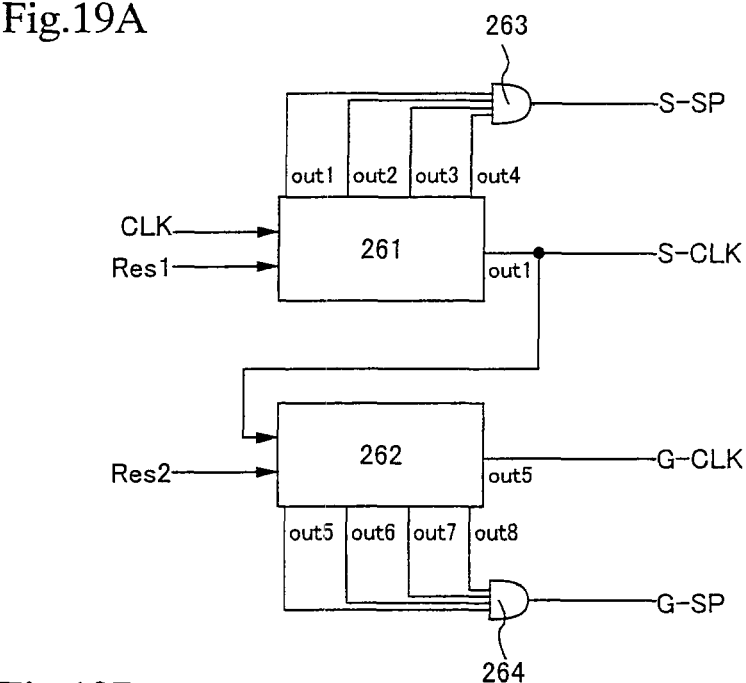
FIGS. 19A and 19B are diagrams for explaining a controller structure.
Figure 19B:
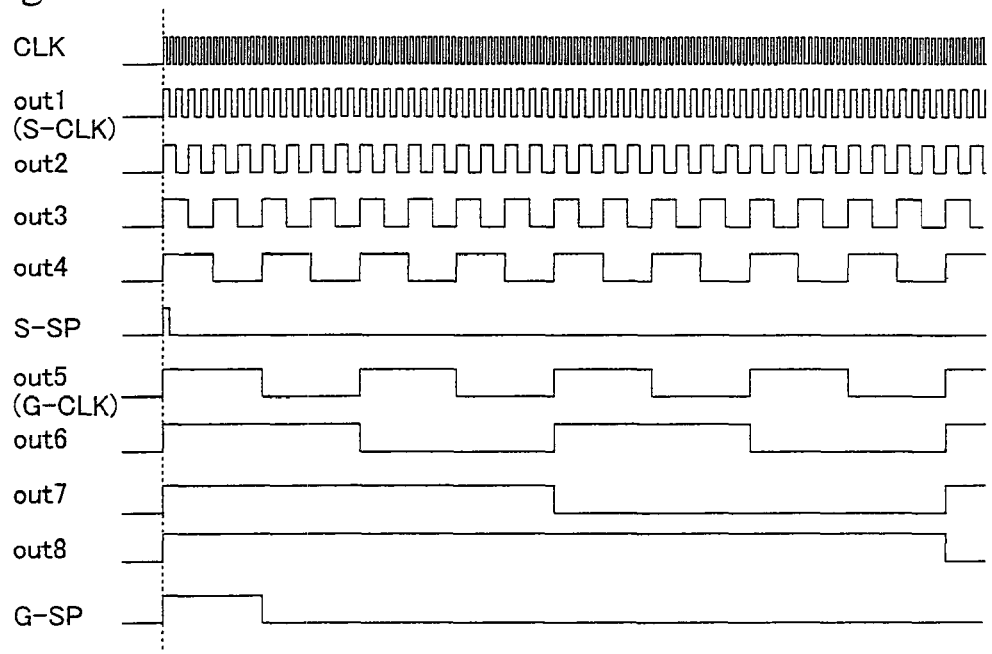

A mechanism, with which the keyboard control circuit (controller) 512 creates clock signals (S-CLK) and start pulse signals (S-SP.) of a source signal line driver circuit, clock signals (G-CLK) and start pulse signals (G-SP) of a gate signal line driver circuit, is explained using FIGS. 19A and 19B. Note that the controller shown in FIGS. 19A and 19B outputs S-SP with a frequency which is $2^4$ times the standard clock signal.

The controller 512 has counter circuits 261 and 262, and AND circuits 263 and 264. Four signals (out 1 to out 4) are input from the counter circuit 261 to the AND circuit 263 when a standard clock signal (CLK) and a reset signal (Res 1) are input to the counter circuit 261. The signal out 1 is a signal with a frequency which is twice that of the standard clock signal, the signals out 2, out3 and out 4 are similarly signals with frequencies which are 4 times, 8 times, and 16 times that of the standard clock signal, respectively.

The signal out 1 is input as S-CLK to the source signal line driver circuit. Further, signals output from the AND 263 are input as S-SP to the source signal line driver circuit.

Further, out 1 and a reset signal (Res 2) are input to the counter circuit 262. Four signals (out 5 to out 8) from the counter circuit 262 are then input to the AND circuit 264. The signal out 5 is a signal with a frequency which is twice that of out 1, and the signals out 6, out 7, and out 8 are signals similarly with frequencies which are 4 times, 8 times, and 16 times that of the signal out 1, respectively.

The signal out 5 is input to the gate signal line driver circuit as G-CLK. Further, signals output from the AND 264 are input to the gate signal line driver circuit as G-SP.

Note that it is possible to freely combine embodiment 3 with Embodiment Modes 1 and 2, and with embodiments 1 and 2.

[Embodimen 4]

Although the presence of button operation is detected using diaphragms in the above stated structure of an electronic device of the present invention, the present invention is not limited to this structure. An example of detecting button operation by using a touch panel is explained in embodiment 4 using FIGS. 20A and 20B.

Figure 20A:
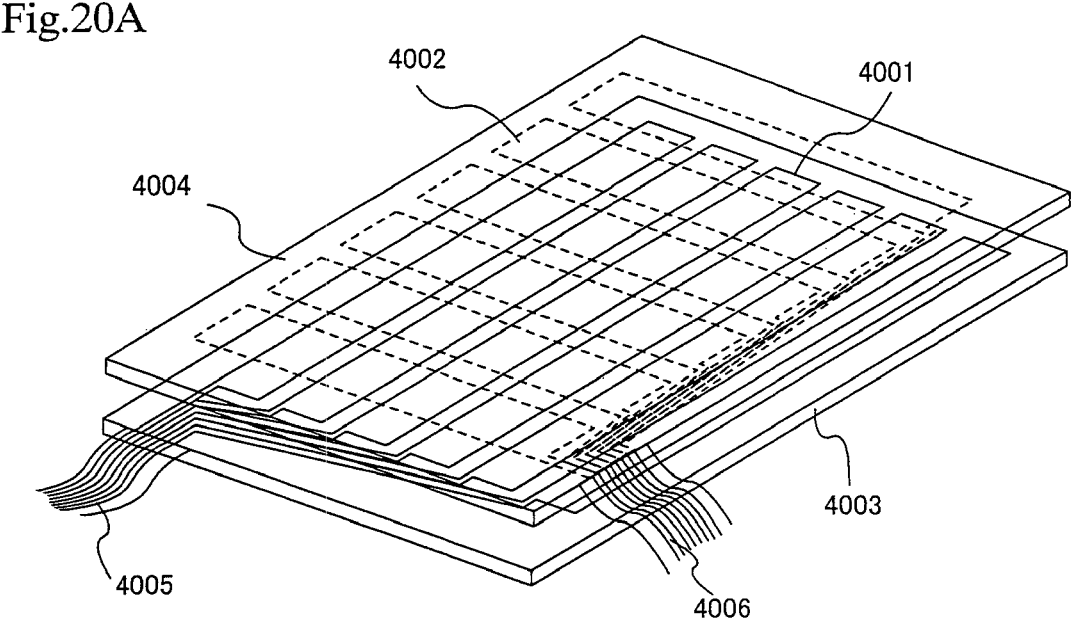
FIGS. 20A and 20B are diagrams for explaining a structure of a touch panel.
Figure 20B:
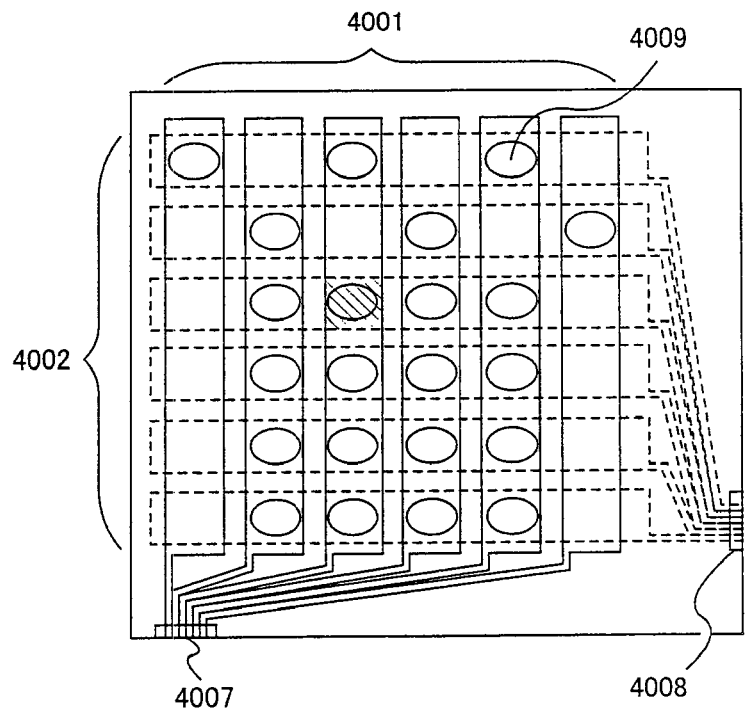

A touch panel has a first substrate 4003 on which first resistive films 4001 of transparent conductive films with a rectangular shape are formed in a row direction, and a second substrate 4004 on which second resistive films 4002 of transparent conductive films with a rectangular shape are formed in a column direction, with a gap formed between the two substrates, as shown in FIGS. 20A and 20B.

A predetermined voltage is applied to the first resistive films 4001 aligned in the row direction through a first FPC 4005 connected to a first resistive film connection portion 4007. Further, a voltage, which is different from the voltage applied to the first resistive films 4001, is applied to the second resistive films 4002 aligned in the column direction through a second FPC 4006 connected to a second resistive film connection portion 4008.

Transparent buttons 4009 are formed in portions at which the first resistive films 4001 and the second resistive films 4002 overlap.

FIGS. 21A and 21B are cross sectional diagrams of operation keys with a touch panel 4010. As shown in FIG. 21A, the first resistive films 4001 and the second resistive films 4002 do not contact each other in a normal state. Further, the first resistive films 4001 and the second resistive films 4002 are connected to the circuits formed on the printed substrate 202 through an FPC or the like.

If pressure is then applied to the surface of the second substrate 4004 by a user pressing the button 4009, one of the first resistive films 4001 and one of the second resistive films 4002 come in contact, as shown in FIG. 21B. A voltage corresponding to the position of contact is generated in the contacting first resistive film 4001 and second resistive film 4002. By measuring changes in the voltage of all the resistive films, it is possible to calculate the position of the contacting first resistive film 4001 and second resistive film 4002. Information on the position of the button 4009 pushed by the user can therefore be taken in to the portable information terminal as electronic data.

Note that it is possible to freely combine embodiment 3 with Embodiment Modes 1 and 2, and with embodiments 1 to 3.

[Embodimen 5]

The brightness of an EL display used as a display device of an electronic device of the present invention, and the brightness of EL elements used in unit displays may be regulated corresponding to the external brightness to the electronic device.

Figure 22:
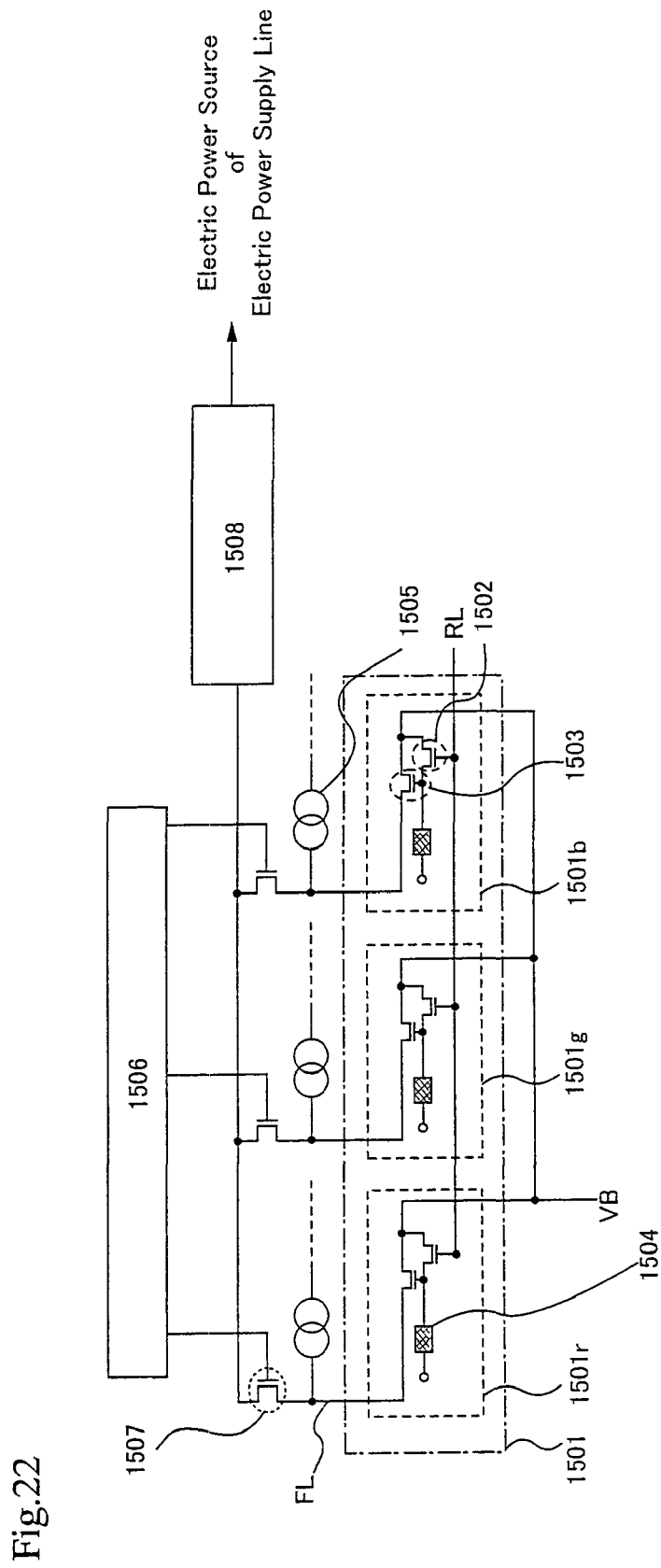
FIG. 22 is a diagram for explaining a structure of a sensor portion.

FIG. 22 shows a structure of a sensor for detecting the external brightness to an electronic device. Note that although a case, in which the brightness of three colors of EL elements. R (red). G (green), and B (blue), are regulated, is explained, it is also possible to apply this method to a case of a single color EL element.

A sensor portion 1501 has sensors corresponding to RGB (an R sensor 1501, a G sensor 1501g, and a B sensor 1501b). in addition, each of the sensors has a reset TFT 1502, a buffer TFT 1503, and a diode 1504.

A gate electrode of the reset TFT 1502 is connected to a reset signal line RL. A source region of the reset TFT 1502 is connected to a sensor electric power source line VB and to a drain region of the buffer TFT 1503. The sensor electric power source line is always maintained at a fixed electric potential (standard electric potential). Further, a drain region of the reset TFT 1502 is connected to the diode 1504 and to a gate electrode of the buffer TFT 1503.

A source region of the buffer TFT 1503 is connected to a sensor output wiring FL. Further, the sensor output wiring FL is connected to a constant electric current power source 1505, and a fixed electric current always flows in the sensor output wiring FL. The drain region of the buffer TFT 1503 is connected to the sensor electric power source line VB, which is always maintained at the fixed standard electric potential, and the buffer TFT 1503 functions as a source follower.

Although not shown in the figures, the diode 1504 has a cathode, an anode, and a photoelectric conversion layer formed between the cathode and the anode.

It is preferable that one of the reset TFT 1502 and the buffer TFT 1503 be an n-channel TFT, and that the other one be a p-channel TFT.

A mechanism, by which the diode 1504 in the sensor portion 1501 detects the external brightness, is explained next.

First, the reset TFT 1502 is turned on by a reset signal input to the reset signal line RL. The standard electric potential of the sensor electric power source line VB is therefore imparted to the gate electrode of the buffer TFT 1503. The source region of the buffer TFT 1503 is connected to the constant electric current power source through the sensor output wiring FL, and an electric potential difference $V_{GS}$ between the source region and the gate electrode of the buffer TFT 1503 is always fixed. The source region of the buffer TFT 1503 is therefore maintained at an electric potential that $V_{GS}$ is subtracted form the standard electric potential. Note that a period during which the reset TFT 1502 is in an on state is referred to as a reset period in this specification.

The electric potential of the reset signal input to the reset signal line RL is then changed, and the reset TFT 1502 is turned off. The standard electric potential of the sensor electric power source line VB is therefore not imparted to the gate electrode of the buffer TFT 1503. Note that a period during which the reset TFT 1502 is in an off state is referred to as a sampling period in this specification.

It is preferable that the sampling period be longer than a reset period for EL displays driven with a digital method.

Electric current flows in the diode 1504 when the external light to the diode 1504 is irradiated. The electric potential of the gate electrode of the buffer TFT 1503, fixed in the reset period, therefore changes in the sampling period. The order of the change in the electric potential of the buffer TFT gate electrode changes in accordance with the amount of the electric current flowing in the diode 1504.

The electric current flowing in the diode 1504 is proportional to the intensity of light irradiated to the diode 1504, in other words, the amount of electric current flowing in the diode 1504 is greater when the outside is bright. The electric potential of the gate electrode of the buffer TFT 1503 thus changes greatly when the outside is bright, compared to when the outside is dark.

The electric potential difference $V_{GS}$ between the source region and the gate electrode of the buffer TFT 1503 is always fixed, and therefore the source region of the buffer TFT 1503 is maintained at an electric potential in which $V_{GS}$ is subtracted form the electric potential of the gate electrode of the buffer TFT 1503. Therefore, if the electric potential of the gate electrode of the buffer TFT 1503 changes, then the electric potential of the source region of the buffer TFT 1503 also changes in accompaniment.

The electric potential of the source region of the buffer TFT 1503 is imparted to the sensor output wiring FL. The electric potential of the sensor output wiring FL is input as a sensor output signal to a brightness regulating circuit 1508 by selection TFTs 1507 selected in order by a sensor selection circuit 1506.

Figure 23:
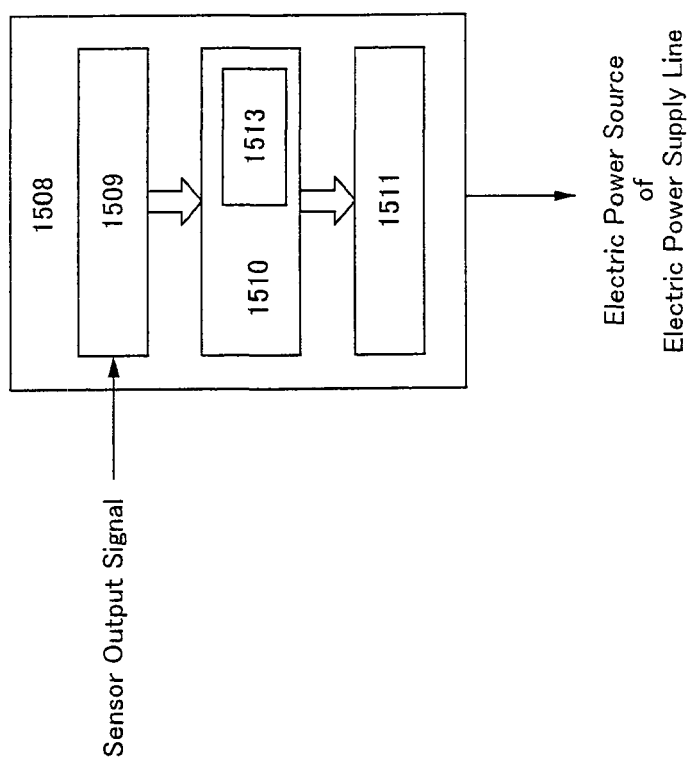
FIG. 23 is a diagram for explaining a device in which brightness is supplemented by signals output from a sensor portion.

FIG. 23 shows a block diagram of the brightness regulating circuit 1508. The brightness regulating circuit 1508 has an A/D converter circuit 1509, a calculation circuit 1510, a supplemental memory 1513, and a D/A converter circuit 1511. Note that although a structure in which the supplemental memory 1513 is a portion of the computation circuit 1510 is shown in FIG. 23, the supplemental memory 1513 may also be formed separately from the computation circuit 1510.

When a sensor output signal is input to the A/D converter circuit 1509, it is converted into a digital sensor signal and then output. The digital sensor output signal output from the A/D converter circuit 1509 is input to the computation circuit 1510.

Values of the electric potential of the appropriate electric power source supply lines with respect to external brightness (supplemental standard data) are stored in the supplemental memory 1513. The computation circuit 1510 calculates the actual external brightness from the digital sensor output signal input to the computation circuit 1510, and reads out the supplemental standard data stored in the supplemental memory 1513.

Then, in accordance with the read out supplemental standard data, a digital data correction signal, which has information on the electric potential of the electric power source supply line (electric power source potential) necessary for obtaining an ideal brightness level in the EL element, is input to the D/A converter circuit 1511.

The digital correction signal input to the D/A converter circuit 1511 is converted to analog, and then input to the electric power source of the electric power source supply lines. The electric power source of the electric power supply lines imparts an electric power source potential, which is determined in accordance with the input analog correction signal, to the electric power source supply lines. For a case in which the external brightness has changed, the electric power source potential of the electric power source supply lines is corrected with respect to the change, and the brightness is regulated so as to become easier for the user to see.

Note that for a case of an EL display using three types of EL elements corresponding to RGB, it is necessary to form the brightness correction circuit 1508 and the electric power source of the electric power source supply lines for each color to be corrected.

Note also that it is possible to freely combine embodiment 5 with Embodiment Modes 1 and 2, and with embodiments 1 to 4.

[Embodimen 6]

Figure 24:
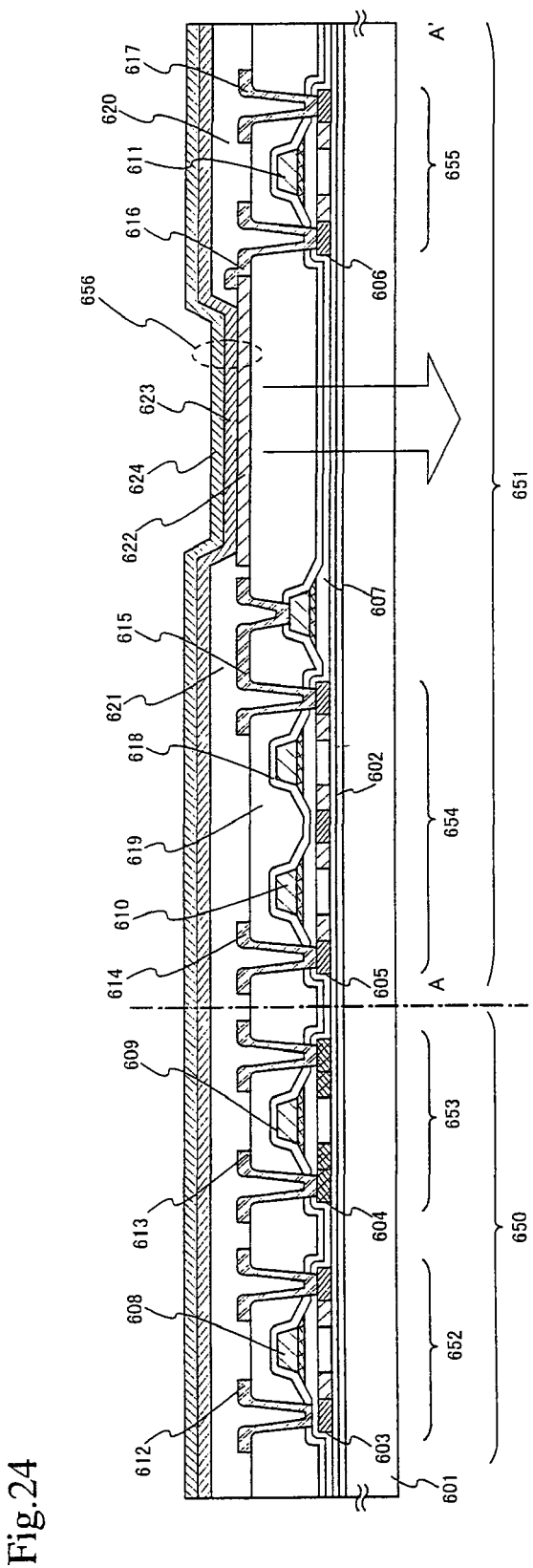
FIG. 24 is a diagram showing a cross sectional structure of an EL display device.

An example showing a structure of an active matrix EL display device is shown in FIG. 24. TFTs are divided into amorphous silicon TFTs and into polysilicon TFTs by the semiconductor film material forming their channel forming regions, and both types may be employed.

A glass substrate or an organic resin substrate is employed as a substrate 601. Organic resin substrates are light weight compared to glass substrates, and act effectively in making electronic devices themselves lighter. Organic resin materials such as polyimide, polyethylene terephthalate (PET), polyethylene naphthalate (PEN), and polyethyl sulfone can be used as materials capable of being applied to the manufacture of unit displays.

However, there are no organic resin substrates currently available which are able withstand a thermal processing temperature greater than 450° C. Nevertheless, it becomes possible to manufacture polysilicon TFTs with the substrate heated to 300° C. or less provided that a laser annealing technique is used. Further, it is often necessary to use hydrogenation processing in polysilicon TFT manufacturing processes, but if hydrogenation processing is performed employing a plasma, a hydrogenation effect can be obtained at a substrate temperature on the order of 200° C.

FIG. 24 shows a state in which an n-channel TFT 652 and a p-channel TFT 653 are formed in a driver circuit 650, and a switching TFT 654 and an EL driver TFT 655 are formed in a pixel portion 651. the TFTs are formed using semiconductor layers 603 to 606, a gate insulating film 607, and gate electrodes 608 to 611.

A blocking layer 602 formed on the substrate 601 is formed having a thickness of 50 to 200 nm from a material such as silicon oxynitride ($SiO_xN_y$) or silicon nitride so that oligomers and the like do not precipitate from the substrate. An interlayer insulating film is composed of an inorganic insulating film 618 formed by a material such as silicon nitride of silicon oxynitride, and an organic insulating film 619 formed by a material such as acrylic or polyimide.

Differences between a gate signal line driver circuit and a source signal line driver circuit are omitted here for the circuit structure of the driver circuit portion 650. Wirings 612 and 613 are connected to the n-channel TFT 652 and to the p-channel TFT 653, and circuits such as shift registers, latch circuits, and buffer circuits are formed using these TFTs.

Figure 25A:
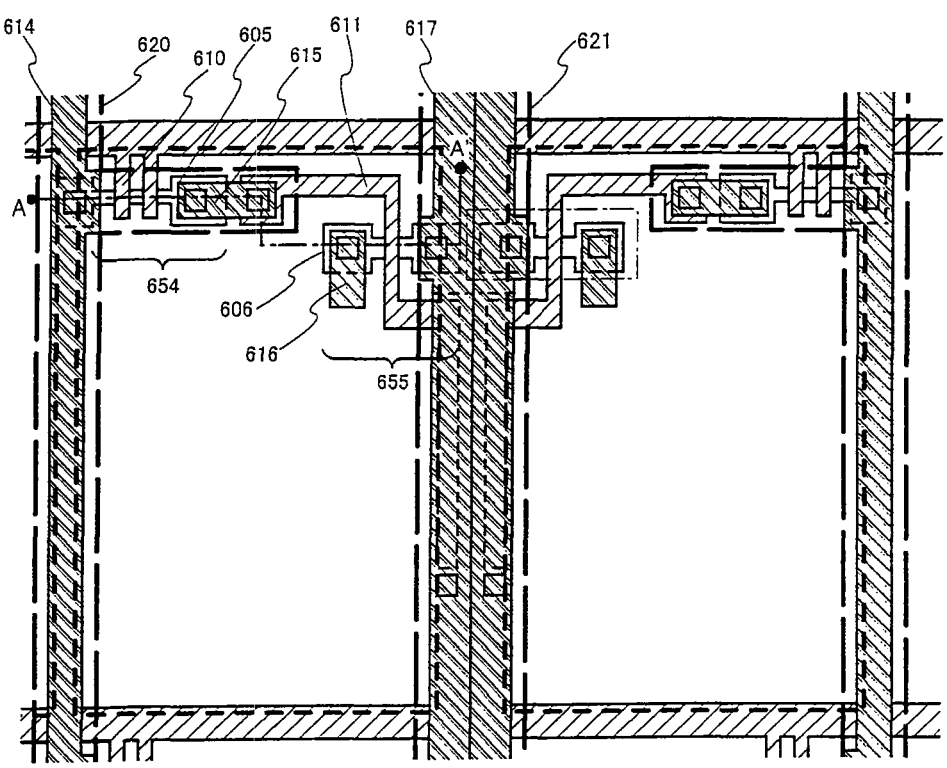
FIGS. 25A and 25B are an upper surface diagram and an equivalent circuit diagram, respectively, of an EL display device.
Figure 25B:
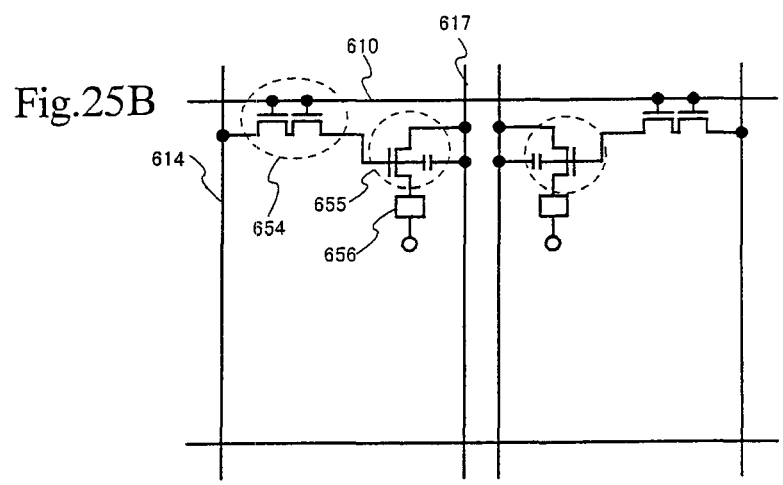

A source signal line 614 is connected to the source side of the switching TFT 654, and a drain side wiring 615 is connected to a gate electrode of the EL driver TFT 655 in the pixel portion 651, further, the source side of the EL driver TFT 655 is connected to an electric power source supply line 617, and a drain side electrode 616 is wired so that it is connected to an anode of an EL element. FIG. 25A shows an upper surface diagram of this type of pixel, and for convenience, is shown using reference symbols that are common with those of FIG. 24. Further, a cross section corresponding to the line A-A' in FIG. 25A is shown in FIG. 24. In addition, FIG. 25B shows an equivalent circuit diagram.

Banks 620 and 621 are formed using an organic material such as acrylic or polyimide, preferably a photosensitive organic resin, so as to cover the wirings in the EL display device, as shown in FIG. 24. An EL element 656 is composed of an anode 622 formed by ITO (indium tin oxide), an EL layer 623 manufactured using an organic EL material, and a cathode 624 formed using a material such as an alkaline metal like MgAg, LiF, and the like, or an alkaline rare earth metal. The banks 620 and 621 are formed so as cover edge portions of the anode 622, and are formed in order to prevent short circuits between the cathode and the anode at these portions.

The cathode 624 of the EL element is formed on the EL layer 623. A material including a low work coefficient element such as magnesium (Mg), lithium (Li), or calcium (Ca) is used. It is preferable to use an MgAg (a material in which Mg and Ag are mixed at a ratio of Mg:Ag=10:1) electrode. An MgAgAl electrode, an LiAl electrode, and an LiFAl electrode can be given as other examples.

It is preferable to perform formation of the cathode 624 in succession after forming the EL layer, without exposure to the atmosphere. This is because the interface state between the cathode 624 and the EL layer 623 has a great influence on the efficiency of light emission for the EL element. Note that light emitting elements formed by an anode (pixel electrode), EL layer, and a cathode are referred to as EL elements throughout this specification.

It is necessary to form the laminate of the EL layer 623 and the cathode 624 separately for each pixel, but the EL layer 623 is extremely weak with respect to moisture, and therefore a normal photolithography technique cannot be used. Further, the cathode 624 manufactured using alkaline metals easily oxidizes. It is therefore preferable to use selective formation by a gas phase method such as vacuum evaporation, sputtering, or plasma CVD while using a physical mask material such as a metal mask. Note that it is also possible to use a method such as ink jet printing or screen printing as the method of selectively forming the EL layer, but at present the cathode cannot then be formed in succession, and thus the above stated methods are preferable.

Further, a protective electrode may also be laminated on the cathode 624 in order to provide protection from external moisture and the like. It is preferable to use a low resistance material containing aluminum (Al), copper (Cu) or silver (Ag) as the protective electrode. Conversely, light can also be emitted in an upward direction in FIG. 24 by using a transparent electrode (referred to as top surface emission, for convenience). If a black color pigment is mixed in to the organic insulating film 619 in this case, a black color screen can be formed when there is no light mission without using a polarizing plate. The protective electrode can also be expected to provide a thermal radiation effect for relieving the heat generated by the EL layer. Further, it is also effective to form up through the protective electrode in succession, without exposure to the atmosphere, after forming the EL layer 623 and the cathode 624.

If an EL display device having integrated EL elements that emit three colors of light is used, then illumination can be performed by a color corresponding to the preference of the user, and along with an incoming call sound, the illumination colors can be changed depending on registered groups, and the screening of incoming calls can be increased. By setting the driver voltage of the EL elements from 1 to 7 V, preferably at 3 V, they can operate at almost the same voltage as the driver voltage for LSIs, and a booster circuit is unnecessary.

In any event, low electric power consumption and high brightness are demanded for cases in which the EL display devices are used in portable electronic devices such as portable telephone devices. Organic compounds which emit light by singlet excitons (hereafter referred to as singlet compounds), and organic compounds which emit light by triplet excitons (hereafter referred to as triplet compounds), exist as EL layer formation materials, and it is possible to use both of them together. Note that the term single compound indicates compounds which emit light only via singlet excitation, and the term triplet excitation indicates compounds which emit light via triplet excitation.

The organic materials recorded in the following reports can be given as typical materials for triplet compounds: 1) Tsutsui, T., Adachi, C., Saito, S., "Photochemical Processes in Organized Molecular Systems," ed. Honda, K., (Elsevier Sci. Pub., Tokyo, 1991), p. 437; and 2) Baldo. M. A., O'Brien, D. F., You, Y., Shoustikov, A., Sibley, S., Thompson, M. E., Forrest, S. R., Nature 395 (1998), p. 151. Organic compounds shown by the following chemical equations are disclosed in these reports. 3) Baldo, M. A., Lamansky, S., Burrows, P. E., Thompson. M. E., Forrest, S. R., Appl. Phys. Lett., 75 (1999), p. 4; and 4) Tsutsui, T., Yang, M.-J., Yahiro, M., Nakamura, K., Watanabe, T., Thuji, T., Fukuda, Y., Wakimoto, T., Mayaguchi, S., Jpn. Appl. Phys., 38 (12B) (1999) L1502.

Further, it is though possible to use light emitting materials expressed by the following molecular formulas (specifically, metallic complexes or organic compounds), not only the light emitting materials recorded in the above reports.

[Chemical Formula 1]
[Chemical Formula 2]

In the above molecular formulas, reference symbol M denotes an element residing in any of groups 8 to 10 of the periodic table. Platinum and indium are used in the above stated reports. Further, the applicants of the present invention consider that nickel, cobalt, and palladium are preferable due to a reduction in manufacturing costs for the EL display device because there are lower in cost compared to platinum and indium. In particular, nickel easily forms complexes, and therefore it has high productivity and is preferable.

The above triplet compounds have higher light emitting efficiency than the singlet compounds, and it is possible to lower the operation voltage for obtaining the same light emission brightness (voltage necessary to make the EL elements emit light).

For example, if a triplet compound having high light emission efficiency is used as a red color light emitting layer, it is possible to use the same operation voltages while obtaining the same light emission brightnesses as those of a green color light emitting layer and a blue color light emitting layer. It therefore becomes possible to perform color display without degradation of the red color light emitting layer happening extremely early, and with problems such as color deviations.

Note that, although an example of using a triplet compound as the red color light emitting layer is shown here, it is also possible to additionally use triplet compounds in the green color light emitting layer or in the blue color light emitting layer.

The switching TFT 654 is a multigate structure in FIG. 24, and an LDD region that overlaps with the gate electrode is formed in the EL driver TFT 655. TFTs using polysilicon exhibit high operation speed, but degradation due to causes such as hot carrier injection easily occur. The formation of TFTs having differing structures within the pixel corresponding to their function (a switching TFT having a sufficiently low off current, and an EL driver TFT which is strong with respect to hot carrier injection), as shown in FIG. 24, is therefore extremely effective in the manufacture of display devices having high reliability and capable of good image display (high operating performance).

Note that it is possible to freely combine embodiment 6 with Embodiment Modes 1 and 2, and with embodiments 1 to 5.

[Embodimen 7]

A structure of a driver circuit of an EL display device is explained next.

Figure 26:
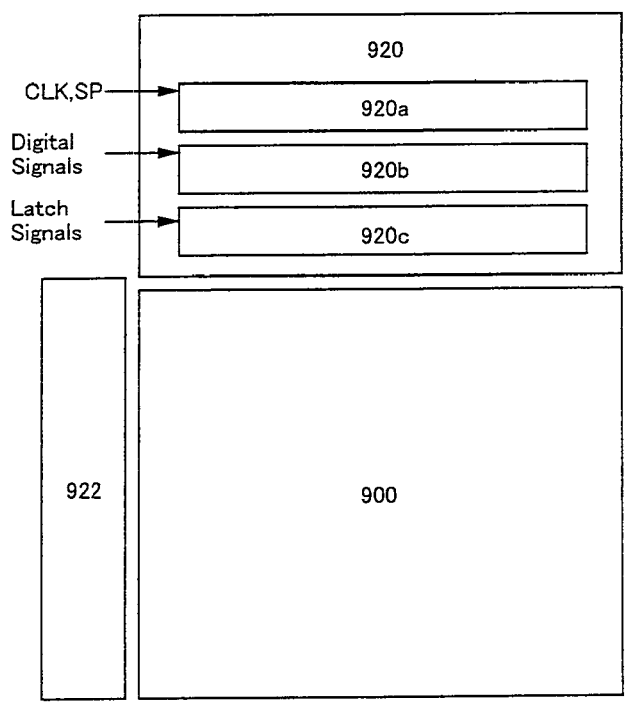
FIG. 26 is a block diagram showing a structure of an EL display device.

As shown in FIG. 26, the EL display device is composed of a source signal line driver circuit 920, a gate signal line driver circuit 922, and a pixel portion 900.

The source signal line driver 920 has a shift register 920*a*, a latch (A) 920*b*, and a latch (B) 920*c*. A clock signal (CLK) and a start pulse (SP) are input to the shift register 920*a* in the source signal line driver circuit 920. The shift register 920*a* generates timing signals in order based upon the clock signal (CLK) and the start pulse (SP), and supplies the timing signals one after another to downstream circuits.

Note that the timing signals from the shift register circuit 920*a* may be buffer amplified by a circuit such as a buffer (not shown in the figure) and then supplied one after another to the downstream circuits as buffer amplified timing signals. The load capacitance (parasitic capacitance) of a wiring to which the timing signals are supplied is large because many of the circuits and elements are connected to the wiring. The buffer is formed in order to prevent bluntness in the rise and fall of the timing signal, generated due to the large load capacitance.

The timing signals from the shift register 920*a* are supplied to the latch (A) 920*b*. The latch (A) 920*b* has a plurality of latch stages for processing digital data signals containing image information. The latch (A) 920*b* writes in and maintains a digital signal simultaneously with the input of the timing signal.

A period during which the digital data signals are completely written into all of the latch states of the latch (A) 920*b* is referred to as a line period. Namely, the line period begins when it begins that the digital data signal is written into the leftmost stage latch within the latch (A) 920*b*, and finishes when it finishes that the digital data signal is written into the rightmost stage latch. In practice, there are cases in which the line period includes the addition of a horizontal return period to the above line period.

A latch signal is supplied to the latch (B) 920*c* when one line period is complete. The digital data signals written in and stored in the latch (A) 920*b* are sent all at once at this instant to the latch (B) 920*c*, and are written into all of the stage latches of the latch (B) 920*c*, and stored. Write in of the digital data signal is again performed, in order, to the latch (A) 920*b* after sending the digital data signals to the latch (B) 920*c*, based on the timing signal from the shift register 920*a*. the digital data signals written into and stored in the latch (B) 920*c* are input to source signal lines S1 to Sx during the second line period.

On the other hand, the gate signal line driver circuit 922 has a shift register and a buffer (both not shown in the figure). Further, the gate signal line driver circuit 922 may also have a level shifter in addition to the shift register and the buffer, depending upon the circumstances. A gate signal from the shift register (not shown in the figure) is supplied to the buffer (not shown in the figure), and is supplied to the corresponding gate signal line. The gate electrodes of the switching TFTs for one line of pixels are connected to gate signal lines G1 to Gy, and the switching TFTs of all of one line of pixels must be placed in an on state simultaneously. A circuit which is capable of flowing a large electric current is therefore used in the buffer. Note that the number of source signal line driver circuits and gate signal line driver circuits, their structures, and their operation are not limited to the structure shown by embodiment 7.

Note that it is possible to freely combine embodiment 7 with Embodiment Modes 1 and 2, and with embodiments 1 to 6.

[Embodimen 8]

An electronic device of the present invention has input means with a plurality of input keys arranged, made from transparent keys and EL display devices. The input keys and function keys are provided, and display from among Japanese Hinayana and numerals can freely be selected in accordance with the operation of a user.

Figure 28A:
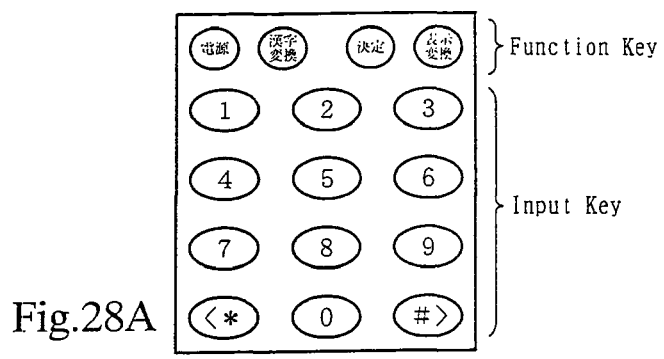
FIGS. 28A to 28C are blow up diagrams of operation keys of an electronic device.
Figure 28B:
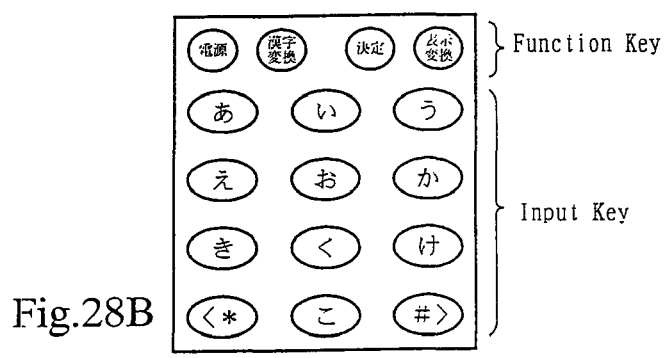
Figure 28C:
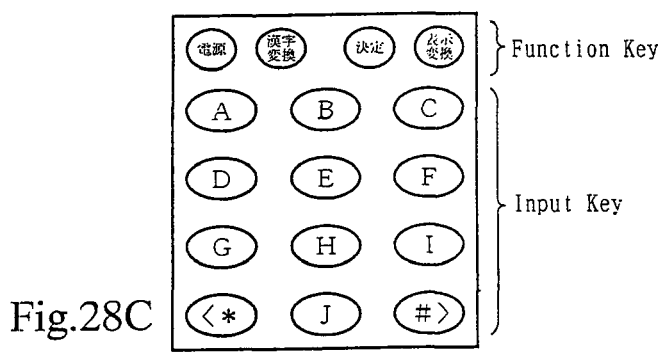

For example, numerals are normally expressed, as shown in FIG. 28A, if the input keys are operated in this state, numerals can be input. The user can change the display to Hinayana display as shown in FIG. 28B, and to alphabet display as shown in FIG. 28C, by operating a display switching key formed as a function key.

It is impossible to display all Hinayana or alphabet characters within the limited number of input keys, but the user can call out the other characters in order by operating ">" and "<" keys. If the EL display device is capable of color display, color information can be added to the input keys. As a result, colors can be displayed corresponding to the user's preference, and the display color can be changed for each registered group along with an incoming call sound, and the discrimination of incoming calls can be increased.

Figure 27:
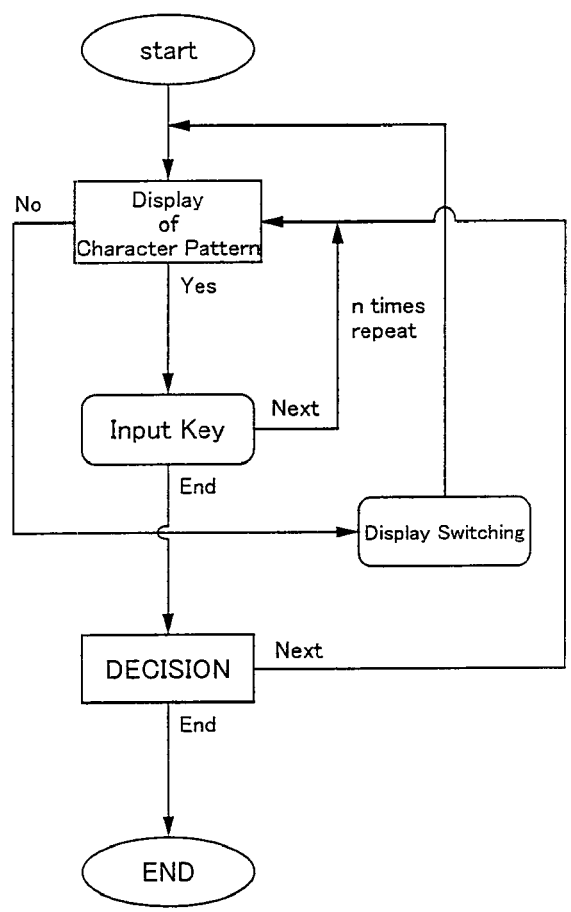
FIG. 27 is a flow chart diagram for explaining operation key display conversion.

Means for the user to input data such as characters and numerals in an electronic device with these types of input keys is explained using the flowchart of FIG. 27. First, predetermined character patterns are displayed when the power source is connected, or when the device is awakened from a standby mode. The display may be numerals, Hinayana, or alphabet characters, as shown in FIGS. 28A to 28C. The flow proceeds in the "Yes" direction in a case of input in accordance with the display, and the user pushes selected input keys, and predetermined data such as a telephone number or a message is input. Operation of the input keys is performed an arbitrary number of times, the flow proceeds in the "Next" direction, and the operation is repeated n times. The flow proceeds in the "End" direction when input of the predetermined data is complete, and the input data can be stored in a storage medium of the electronic device if a decision key is pressed. In addition, the flow proceeds in the "Next" direction for a case in which the user wants to continue input, and similar operations are repeated. Further, if the input is complete, the flow proceeds in the "End" direction, and operations are complete.

For cases in which the characters that the user wants to input are not displayed at the character pattern display state, the flow proceeds in the "No" direction, and the display switching key is operated. The character pattern display changes as a result. Similar processing is performed subsequently, and predetermined data can be input.

Note that it is possible to freely combine embodiment 8 with Embodiment Modes 1 and 2, and with embodiments 1 to 7.

[Embodimen 9]

Figure 29A:
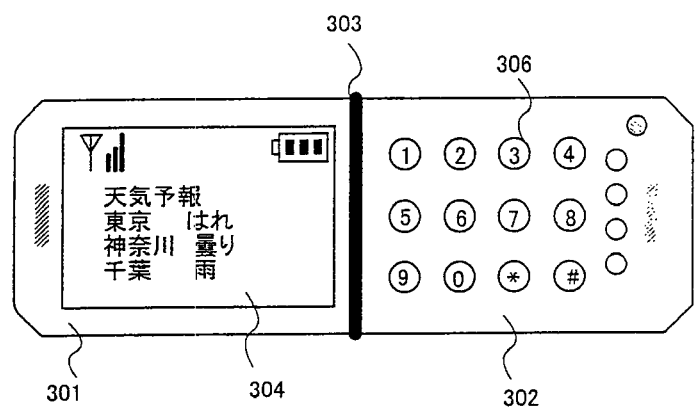
FIGS. 29A and 29B are external view diagrams of an electronic device using the present invention.
Figure 29B:
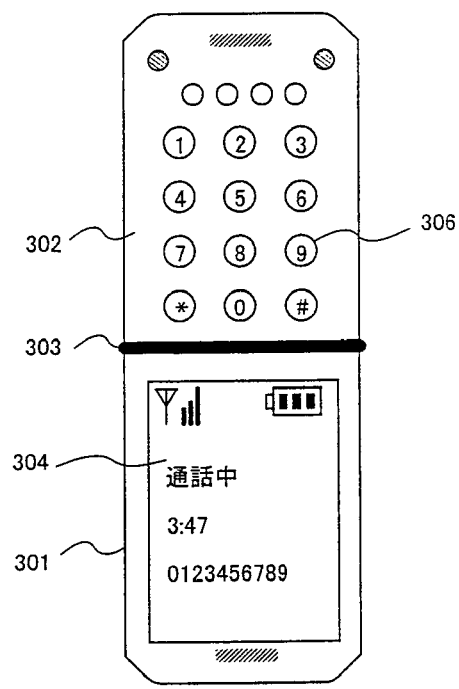

An example of an external view diagram of an electronic device completed in accordance with the present invention is shown in FIGS. 29A and 29B.

FIG. 29A shows a case in which the direction of images displayed in a display portion 304, and the direction of images such as characters, numerals, and symbols displayed in operation keys 306, are natural as seen from a user when a display panel 301 and an operation panel 302 are aligned horizontally with each other.

FIG. 29B shows a case in which the direction of images displayed in the display portion 304, and the direction of images such as characters, numerals, and symbols displayed in the operation keys 306, are natural as seen from a user when the display panel 301 and the operation panel 302 are aligned vertically.

The electronic device of the present invention can be adjusted to the user's usage preference, and it is possible to switch the direction of the images displayed in the display portion 304, and the direction of the images such as characters, numerals, and symbols displayed in the operation keys 306, between the direction shown in FIG. 29A and the direction shown in FIG. 29B.

Note that, although the image directions displayed in the display portion 304, and the direction of the images such as characters, numerals, and symbols displayed in the operation keys 306 are the same in FIGS. 29A and 29B, the present invention is not limited to this. The direction of the images displayed in the display portion 304 and the direction of the images such as characters, numerals, and symbols displayed in the operation keys 306 may also be different. Further, the characters, numerals, and symbols displayed in the operation keys as shown in FIGS. 29A and 29B are only one example, and the electronic device of the present invention is not limited to these characters, numerals, and symbols.

Further, a structure in which the direction of the images displayed in the display portion 304 and the direction of the images such as characters, numerals, and symbols displayed in the operation keys 306 are automatically changed in accordance with an angle è in a connection portion 303 between a surface having the display portion 304 of the display panel 301, and a surface having the operation keys 306 of the operation panel 302, may also be used.

Further, a structure in which the brightness of the display of the operation key is switchable may also be used. The operation keys 306 shown in FIG. 30A display a single black color symbol, or a plurality of black color symbols, on a white background. The operation keys 306 shown in FIG. 30B display a single white color symbol, or a plurality of white color symbols, on a black background.

Figure 30A:
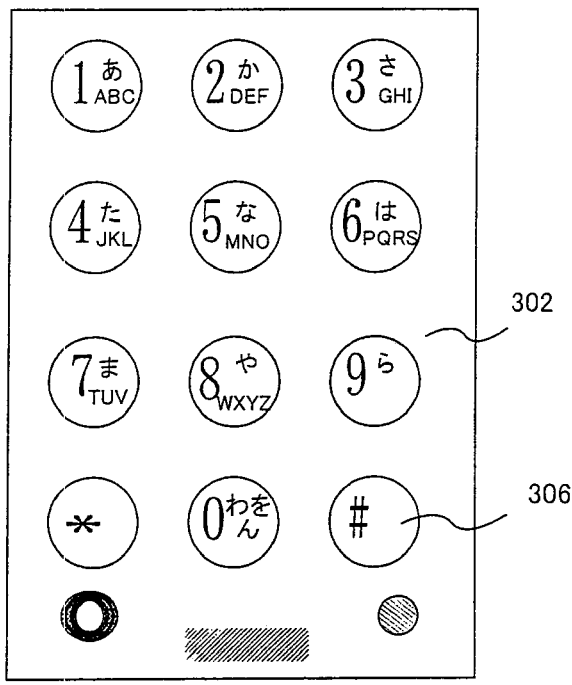
FIGS. 30A and 30B are blow up diagrams of operation keys of an electronic device.
Figure 30B:
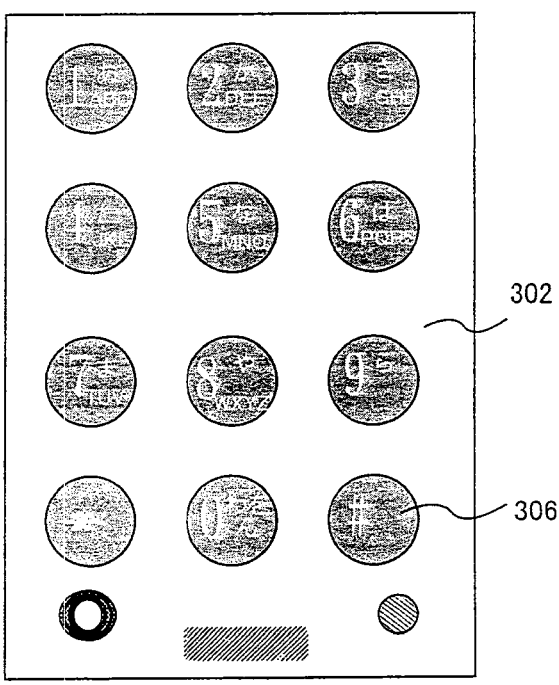

Note that, although the operation keys 306 for performing black color display or white color display are explained with FIGS. 30A and 30B, the present invention is not limited to this. The operation keys 306 may also perform the display of a color except white. For example, they may perform yellow color display on a black background, green color display on a white background, or black color display on a blue background.

It is possible to suppress the electric power consumption of the electronic device itself in accordance with the above structure.

Figure 31:
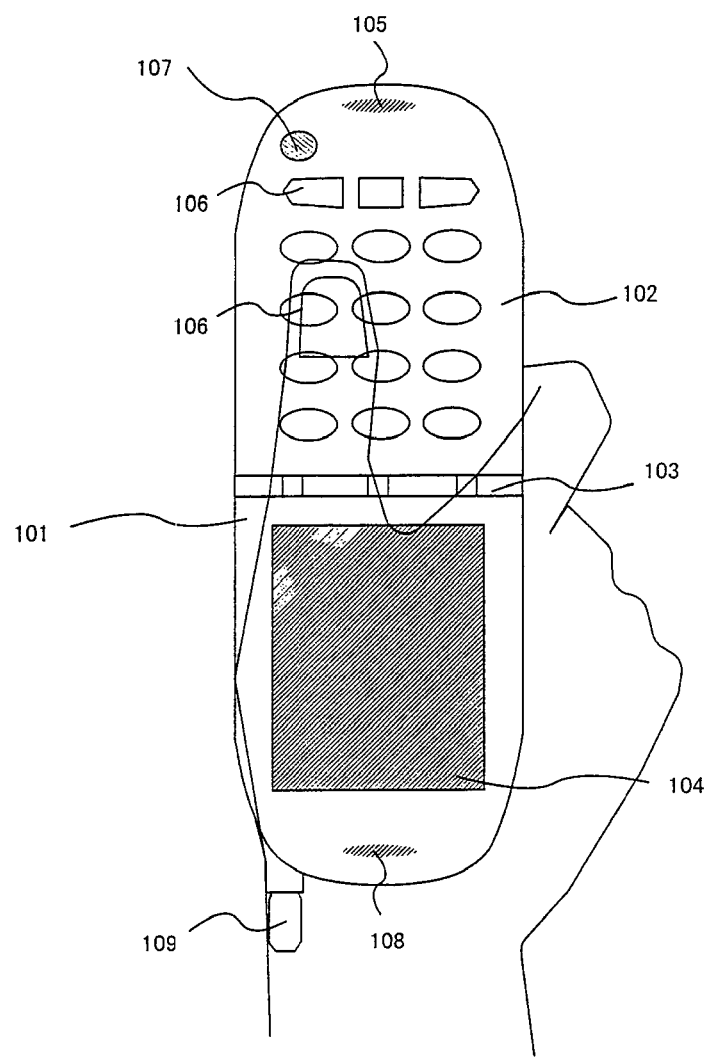
FIG. 31 is a diagram for explaining an embodiment for using an electronic device of the present invention.

Further, it becomes possible to connect to the Internet with a portable telephone device, and perform tasks such as sending and receiving electronic mail, and searching homepages. The character information except audio is often input by operating the operation keys with one hand. In this case, the thumb or forefinger of the dominant hand operates the operation keys. FIG. 31 is a diagram for explaining a usage embodiment of the portable telephone shown in FIG. 1. In order to increase the amount of image information displayed on one screen, and to realize the display with a high definition, the display device is made large size in a portable telephone device capable of connecting to the Internet. However, along with an improvement in performance of the screen, information displayed becomes easily visible by a third party other than the user, and privacy becomes difficult to be maintained.

In contrast, with the arrangement of the operation keys and the display device 104 of the portable telephone device of the present invention, the screen of the display device 104 can be somewhat covered and hidden by the user's palm while operating the operation keys 106, and therefore privacy can be maintained. Further, the user can enjoy a feeling of relief.

By mounting image sensors or area sensors in the display device 104, and by using the portable telephone device while hiding the display device 104 with the palm of one hand, authentication of the user can be performed using the palm print (lines of the palm). Along with performing key operation of the operation keys 106, the sensor mounted display device senses the palm print of the user and reads in individual information to perform authentication. Authentication operations are performed by verifying the individual information read in by the sensors with individual information stored in an internal flash memory or a non-volatile memory.

Figure 32:
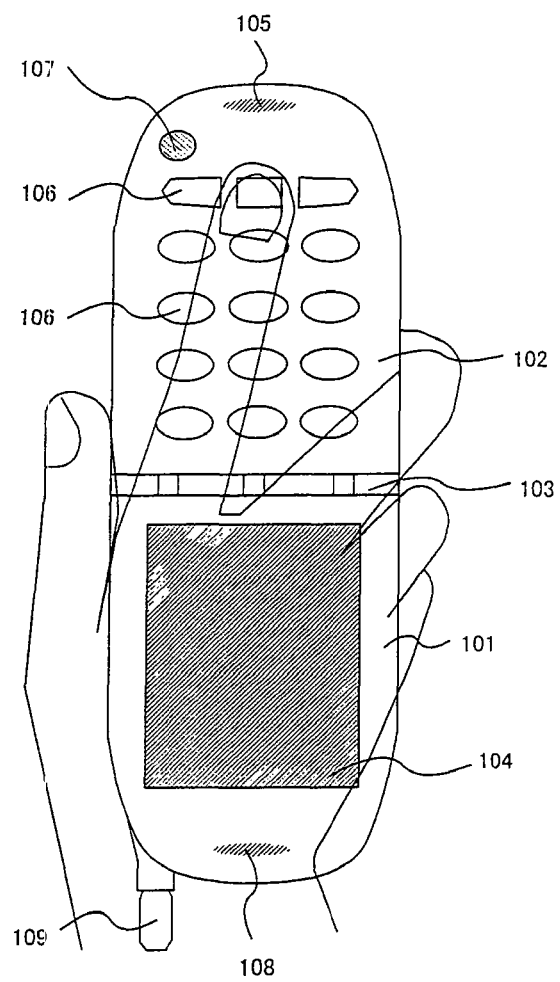
FIG. 32 is a diagram for explaining an embodiment for using an electronic device of the present invention.

Note that although an example of the operation of the operation keys 106 using a thumb is shown in FIG. 31, it is similar to the cases in which operations are performed using a forefinger, as shown in FIG. 32.

Further, the brightness of an EL display used as a display device of an electronic device of the present invention, and the brightness of EL elements used for unit displays may also be regulated in response to the brightness outside of the electronic device.

[Embodimen 10]

Figures 33A, 33B:
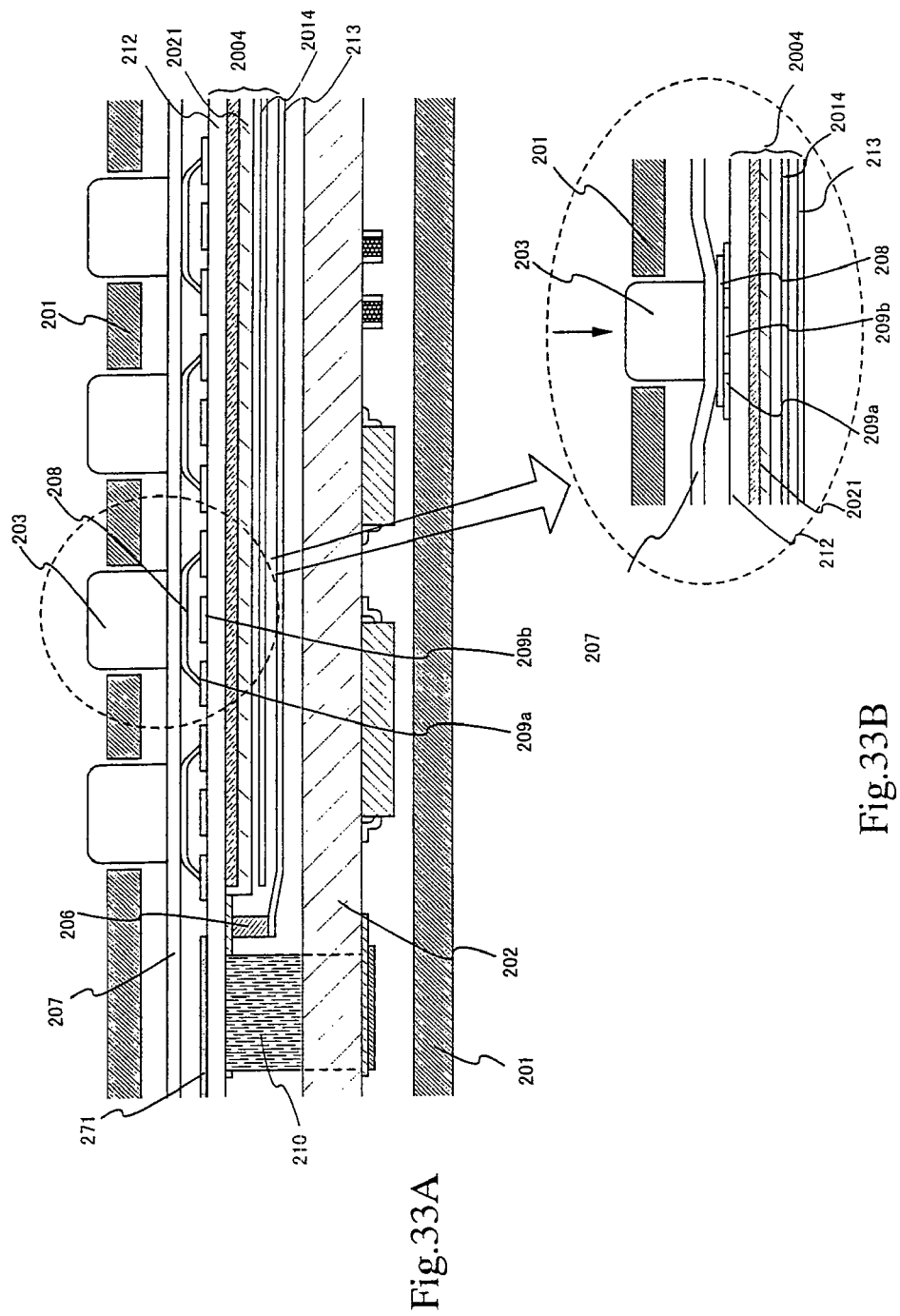
FIGS. 33A and 33B are diagrams for explaining a structure of operation keys of an electronic device in the present invention.

FIGS. 33A and 33B are cross sectional diagrams for explaining a structure of operation keys in an example of a portable telephone or a PDA using the present invention. An example of using a transmission type liquid crystal display device is shown in embodiment 10. Note that portions which are the same as in FIGS. 2A and 2B use the same reference symbols.

The printed substrate 202 formed of glass epoxy resin or ceramic is inside the frame 201 in FIG. 33A, and the signal sending and receiving circuit portion, loaded with the signal processing circuits such as the CPU (microprocessor) as the base band portion, the DSP (digital signal processor), and various types of memory (flash memory and SRAM), and mixers and frequency synthesizers, is formed inside the frame 201.

A liquid crystal display device 2004 is formed on the side of the printed substrate 202 which is opposite to the surface on which the above circuits are formed. The liquid crystal display device 2004 has the substrate 212, a sealing material 2021, a conductive plate 2014, and the cover material 213. The liquid crystal display device 2004 is sealed between the substrates. Further, a backlight (not shown in the figures) is formed in an edge portion of the conductive plate 2014.

Buttons 203 which are capable of being recognized from the outside of the frame 201 are transparent, and the liquid crystal display device 2004 is formed under the buttons 203. Symbols displayed by the liquid crystal display devices 2004 can thus be recognized through the transparent buttons 203.

The liquid crystal display device 2004 is connected to the wiring 206 formed on the substrate 212. No particular limitations are placed on the connection method for the circuits of the printed substrate 202 and the circuits of the substrate 212, and for example, the wiring 206 and the printed substrate 202 circuits may also be connected using an FPC (flexible printed circuit).

The electrodes 209a and 209b, the diaphragm 208, and flexible sheet 207 to which the diaphragm 208 is fixed are formed between the transparent buttons 203 and the substrate 212. The diaphragm 208 is formed of an alloy containing aluminum or copper as its main constituent, and possesses conductivity. The diaphragms 208 are formed corresponding to the buttons 203. The electrodes 209a and 209b are connected to a circuit for sensing the input among the above circuits.

As shown in FIG. 33A, the diaphragm 208 is in contacts with only one of the electrodes, the electrode 209a, in a normal state. If a user then pushed the button 203, the flexible sheet 207 and the diaphragm 208 change their shapes, and the diaphragm 208 comes into contacts with both the electrode 209a and the electrode 209b to cause conduction, as shown in FIG. 33B. Button operation is thus detected, and input information is obtained.

FIGS. 34A and 34B are cross sectional diagrams for explaining a structure of operation keys in an example of a portable telephone or a PDA using the present invention, similarly to FIGS. 33A and 33B. An example of using a reflection type liquid crystal display device is shown in FIGS. 34A and 34B.

A plurality of the electrodes 209a and the electrodes 209b are formed on the substrate 215 in cases of using a reflecting liquid crystal display device. The liquid crystal display device 2004 and the wiring 206 are formed on the substrate 212. the conductive plate 2014 is formed between the substrate 212 and the substrate 215, and a front light (not shown in the figures) is formed in an edge portion of the conductive plate 2014.

As shown in FIG. 34A, the diaphragm 208 is in contacts with only one of the electrodes in a normal state, the electrode 209a. If a user then pushed the button 203, the flexible sheet 207 and the diaphragm 208 change their shapes, and the diaphragm 208 comes into contacts with both the electrode 209a and the electrode 209b to cause conduction, as shown in FIG. 34B. Button operation is thus detected, and input information is obtained.

Further, it is possible to sense button operation using a touch panel, without using a diaphragm.

Figures 35A, 35B:
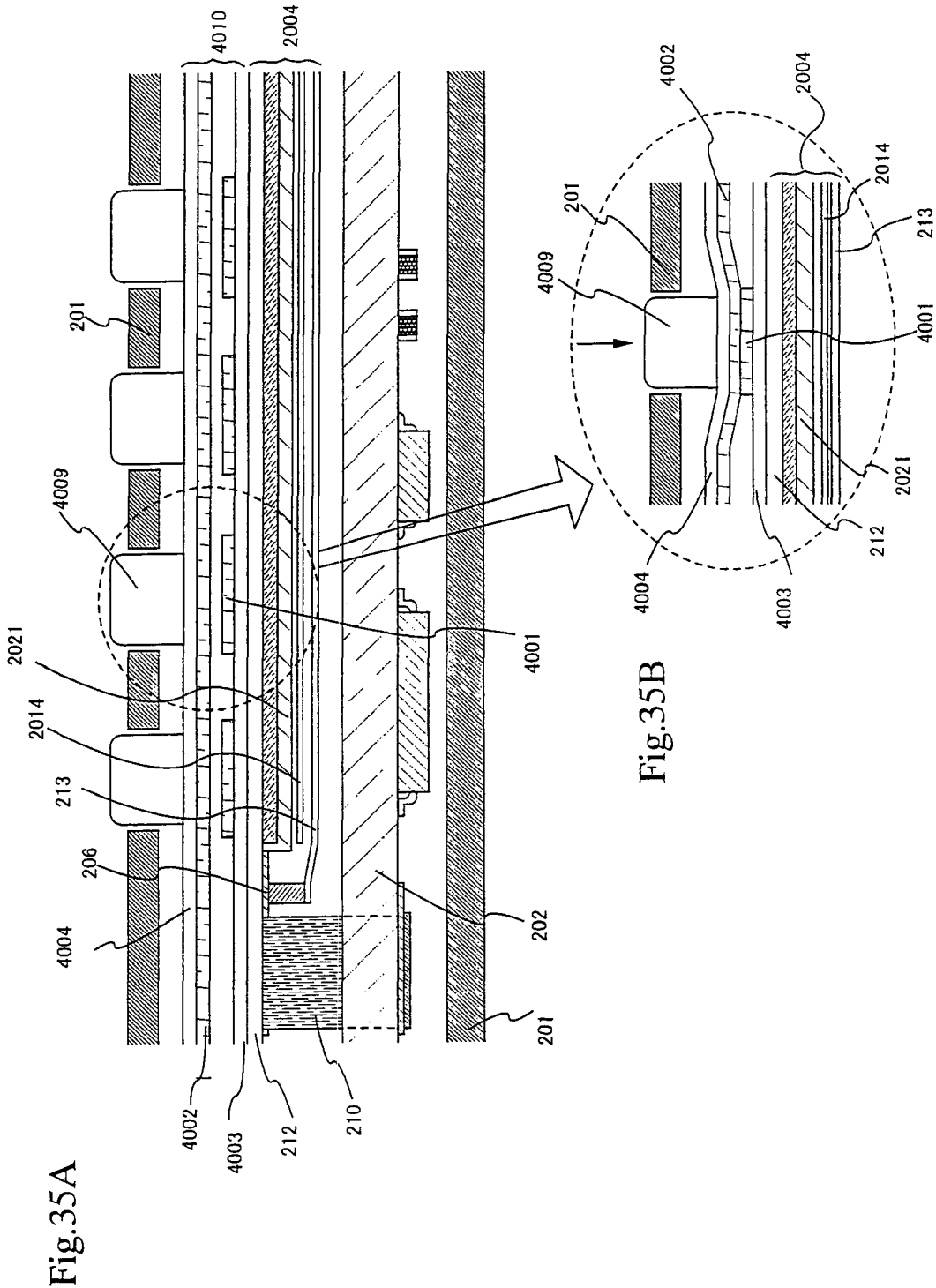
FIGS. 35A and 35B are diagrams for explaining a structure of operation keys of an electronic device in the present invention.

FIGS. 35A and 35B are cross sectional diagrams of operation keys including the touch panel 4010. As shown in FIG. 35A, the first resistive films 4001 and the second resistive films 4002 do not contact each other in a normal state. Further, the first resistive films 4001 or the second resistive films 4002 is connected to the circuits formed on the printed substrate 202 through an FPC or the like.

Note that the liquid crystal display device 2004 shown by FIGS. 35A and 35B is structured of the liquid crystal display device 2004 formed on the substrate 212, the conductive plate 2014, and the cover material 213. Further, although the liquid crystal display device 2004 shown by FIGS. 35A and 35B is a transmission type liquid crystal display device, the present invention is not limited to such and a reflection type liquid crystal display device (not shown in the figures) can also be used.

If pressure is then applied to the surface of the second substrate 4004 by a user pressing the button 4009, one of the first resistive films 4001 and one of the second resistive films 4002 will come in contact with each other, as shown in FIG. 35B. A voltage corresponding to the position of the contact is generated in the contacting first resistive film 4001 and the contacting second resistive film 4002. By measuring changes in the voltage of all the resistive films, it is possible to calculate the position of the contacting first resistive film 4001 and the contacting second resistive film 4002 in the contact. Information on the position of the button 4009 pushed by the user can therefore be taken in to the portable information terminal as electronic data.

Note that it is possible to freely combine embodiment 10 with Embodiment Modes 1 and 2, and with embodiments 1 to 9.

[Embodimen 11]

Figure 36:
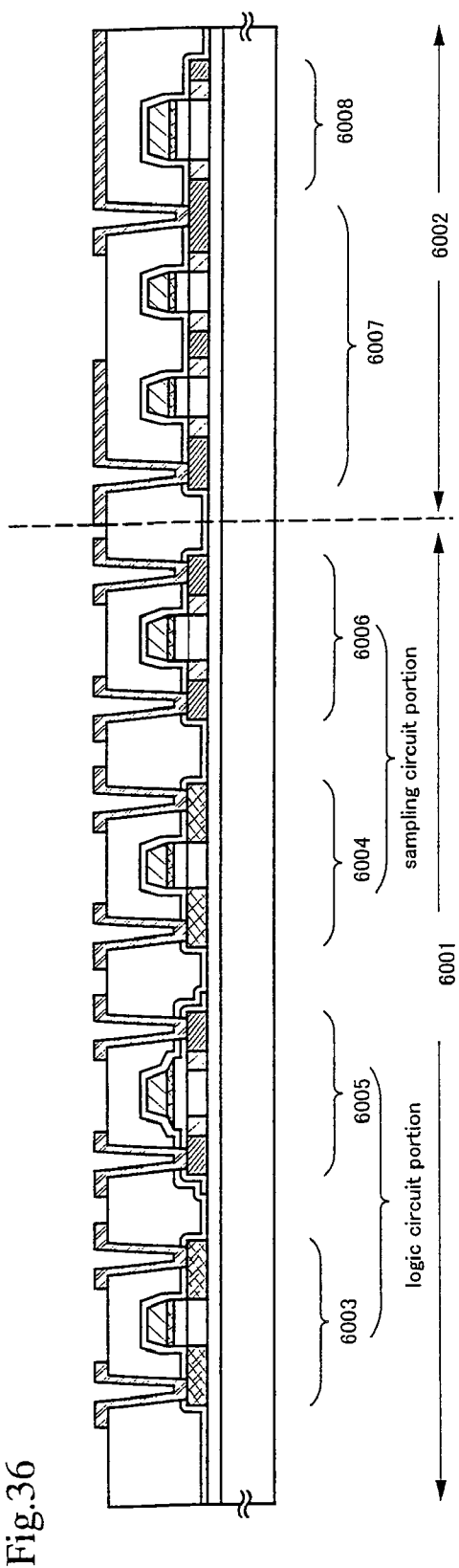
FIG. 36 is a diagram showing a cross sectional structure of a liquid crystal display device.

A structure of a pixel portion of a liquid crystal display device used by the present invention is explained using FIG. 36.

An example of a liquid crystal display device having a pixel portion and a driver circuit for driving the pixel portion on a substrate(however, this is in a state before sealing the liquid crystal material) is shown.

Note that a CMOS circuit as a basic unit, is shown in the driver circuit, and that one pixel is shown in the pixel portion.

In FIG. 36, A driver circuit 6001 composed of n-channel TFTs 6005 and 6006, and p-channel TFTs 6003 and 6004, and a pixel portion 6002 composed of a pixel TFT 6007 of an n-channel TFT, and a storage capacitor 6008, are formed. Further, all TFTs in embodiment 11 are formed by top gate TFTs.

The channel TFT (pixel TFT) 6007 forms a structure having two channel forming regions between a source region and a drain region (double gate structure), but embodiment 11 is not limited to the double gate structure, and a single gate structure in which one channel forming region is formed, and a triple gate structure in which three channel forming regions are formed may also be used.

Further, the liquid crystal display device shown in FIG. 36 is a reflecting type, and a pixel electrode connected to a drain region of the n-channel TFT (pixel TFT) 6007 is a reflecting electrode. It is preferable to use a film having superior reflectivity, such as a film having Al or Ag as its main constituent, or a lamination of such films, as the pixel electrode material. Further, it is preferable to make the surface rough by adding a known process step such as sandblasting or etching after forming the pixel electrode, increasing the white color level by preventing specular reflection and scattering reflected light.

Note that, although an example of a reflecting type liquid crystal display device with a reflecting electrode as a pixel electrode is shown in FIG. 36, it is also possible to use a transmission type liquid crystal display device using a transparent conductive film, substituting for the reflecting electrode, as the pixel electrode.

After obtaining the state of FIG. 36, an orientation film is formed on the pixel electrode and a rubbing process is performed. Note that, in embodiment 11, before forming the orientation film, rod shape spacers for maintaining a substrate gap are formed in desired locations by patterning an organic resin film such as an acrylic resin film. Further, ball shape spacers may also be distributed over the entire substrate surface as a substitute for the rod shape spacers.

An opposing substrate is prepared next. After forming coloration layers and light shielding layers on the opposing substrate, a leveling film is formed. Next, an opposing electrode is formed on the leveling film from a transparent conductive film, in at least the pixel portion. An orientation film is formed over the entire surface of the opposing electrode, and a rubbing process is performed.

The stainless steel substrate on which the pixel portion and the driver circuit portion are formed is then joined with the fixed substrate by an adhesive layer (a sealing material in embodiment 11). A filler is mixed into the adhesive layer, and the two substrates are joined while maintaining a uniform gap by using the filler and the rod shape spacers. A liquid crystal material is then injected between both substrates, and this is completely sealed using a sealant (not shown in the figure). Known liquid crystal materials may be used for the liquid crystal material.

Note that the pixel portion of the liquid crystal display device of the present invention is not limited to the structure shown in FIG. 36.

Figure 37A:
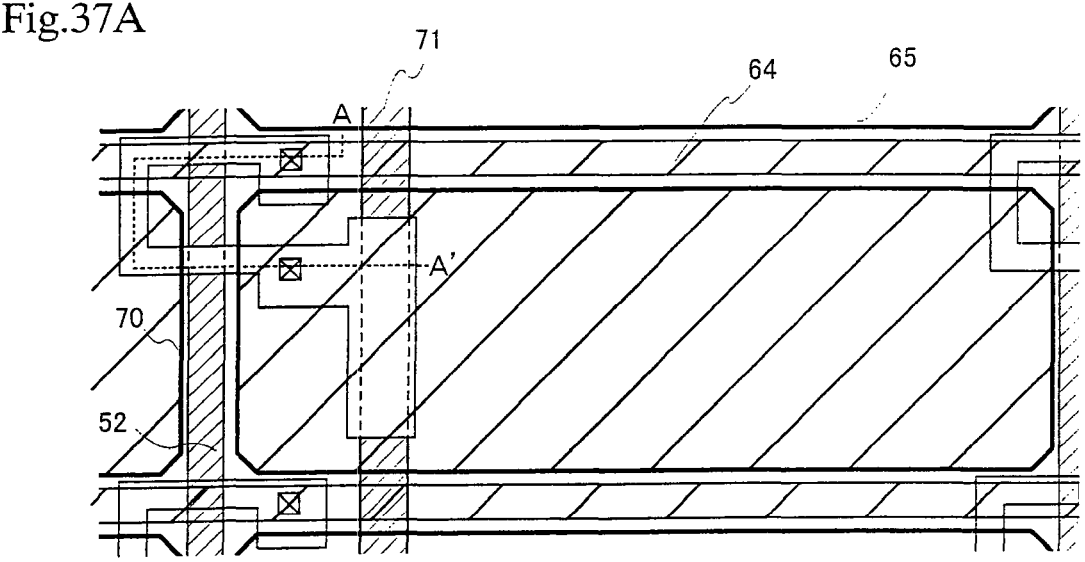
FIGS. 37A and 37B are upper surface diagrams of a liquid crystal display device.
Figure 37B:
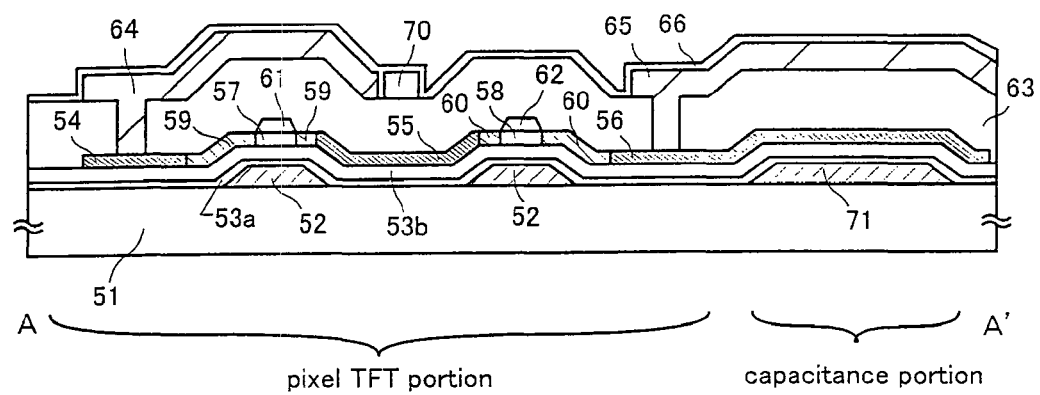

An example of a structure, in which the TFTs used in the pixel portion and the driver circuit of the liquid crystal display device is composed of reverse stagger TFTs is shown in FIGS. 37A and 37B. FIG. 37A is a blow up of an upper surface diagram of one pixel of the pixel portion, and the portion cut along the dotted line A-A' in FIG. 37A corresponds to the cross sectional structure of the pixel portion of FIG. 37B. note that reference numeral 51 in FIG. 37B denotes a substrate having an insulating surface.

A pixel TFT portion is formed by an n-channel TFT in the pixel portion. A gate electrode 52 is formed on the substrate 51, a first insulating film 53a made from silicon nitride, and a second insulating film 53b made from silicon oxide are ten formed on the gate electrode 52. Further. n+ regions 54 to 56 and channel forming regions 57 and 58 on the second insulating film as active layers, are formed, and n– regions 59 and 60 are formed between the n+ regions and the channel forming regions. Further, insulating films 61 and 62 protect the channel forming regions 57 and 58. After forming contact holes in the insulating films 61 and 62, and in a first interlayer insulating film 63 covering the active layers, a wiring 64 connected to the n+ region 54 is formed, and a pixel electrode 65 made from a material such as Al or Ag is connected to the n+ region 56. In addition, a passivation film 66 is formed theron. Furthermore, reference numeral 70 denotes a pixel electrode of a pixel adjacent to a pixel electrode 65.

Note that, although gate wirings of the pixel TFTs of the pixel portion have a double gate structure in embodiment 11, they may also have a multi-gate structure such as a triple gate structure in order to reduce dispersions in the off current. Further, a single gate structure may also be used in order to incrperformance the aperture ratio.

Further, a capacitance portion of the pixel portion is composed of a capacitance wiring 71 and n+ region 56, using the first insulating film and the second insulating film as dielectric.

Note that the pixel portion shown by FIGS. 37A and 37B is one example, and the present invention is not limited to this structure.

An example of a structure of the driver circuit of the liquid crystal display device is explained next.

Figure 38A:
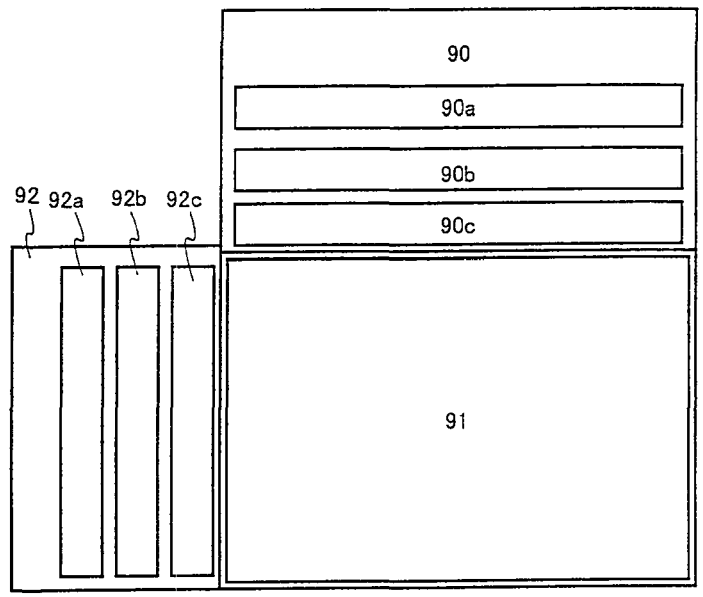
FIGS. 38A and 38B are block diagrams showing a structure of a liquid crystal display device.

FIG. 38A is a circuit structure for performing analog drive. The circuit has a source line driver circuit 90, a pixel portion 91, and a gate line driver circuit 92 in embodiment 11. Note that the term driver circuit is a generic term within this specification that includes source signal line driver circuits and gate signal line driver circuits.

A shift register 90a, a buffer 90b, and a sampling circuit (transfer gate) 90c are formed in the source line driver circuit 90. Further, a shift register 92a, a level shifter 92b, and a buffer 92c are formed in the gate line driver circuit 92. When necessary, a level shifter circuit may also be formed between the sampling circuit and the shift register circuit.

Further, the pixel portion has a plurality of pixels, and a TFT element is formed in each of the plurality of pixels.

All the source line driver circuit 90 and the gate line driver circuit 92 can be formed by p-channel TFTs or by n-channel TFTs.

Note that, although not shown in the figures, an additional gate side driver circuit may also be formed on the side opposite to the gate side driver circuit 92, sandwiching the pixel portion 91.

Figure 38B:
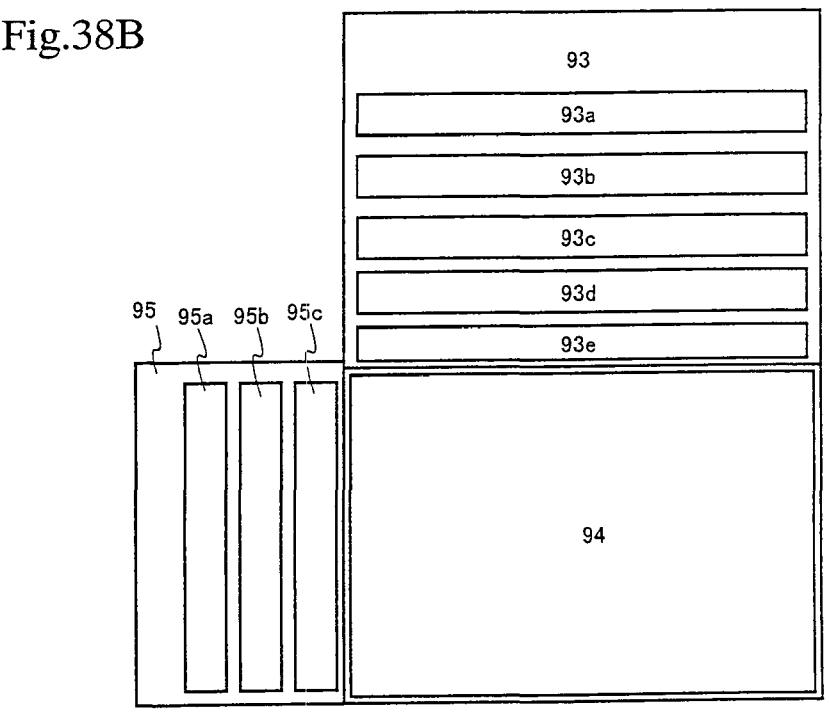

Further, a latch (A) 93b and a latch (B) 93c may be formed as substitutes for the sampling circuits in cases of using digital drive, as shown in FIG. 38B. A shift register 93a, the latch (A) 93b, the latch (B) 93c, a D/A converter 93d, and a buffer 93e are formed in a source side driver circuit 93. Further, a shift register 95a, a level shifter 95b, and a buffer 95c are formed in a gate side driver circuit 95. when necessary, a level shifter circuit may also be formed between the latch (B) 93c and the D/A converter 93d.

Only the structures of the pixel portion and the driver circuit are shown in FIGS. 38A and 38B, but a memory or a microprocessor may be formed in addition.

Note that it is possible to freely combine embodiment 11 with Embodiment Modes 1 and 2, and with embodiments 1 to 10.

[Embodimen 12]

An example of an electronic device of the present invention which is different from FIG. 1 is explained in embodiment 12.

Figure 39A:
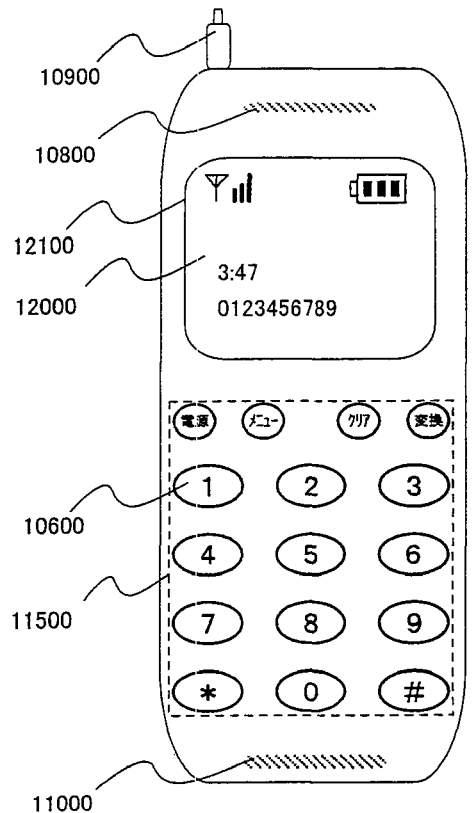
FIGS. 39A and 39B are diagrams for explaining an example of a portable electronic device of the present invention.
Figure 39B:
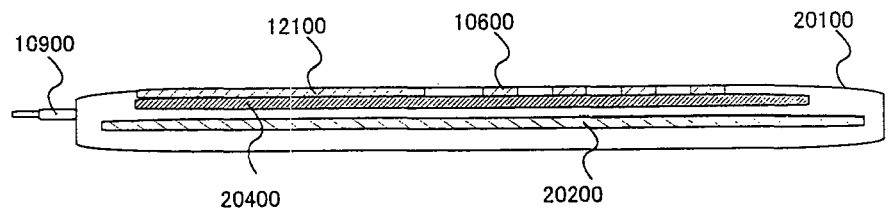

FIGS. 39A and 39B are diagrams showing an example of al electronic device to which the present invention is applied. An antenna 10900, an audio input portion 10800, an audio output portion 11000, a plurality of operation keys 11500 which have transparent buttons 10600, and the like are provided in a portable telephone shown in FIG. 39A. Further, a transparent cover 12100 is formed so as to overlap with a display portion 12000.

FIG. 39B is a diagram showing a cross sectional view of the example of the portable telephone of FIG. 39A, the antenna 10900, the display portion 12000, a cover 12100, the buttons 10600, a printed substrate 20200, and the like are provided inside a frame 20100, the frame 20100 has a structure in which the transparent cover 12100 and the transparent buttons 12100 are built in and thus a structure in which display of a liquid crystal display device 20400 can be recognized through the cover 12100 and the buttons 10600.

The liquid crystal display device 20400 is formed inside the frame 20100. The liquid crystal display device 20400 has a pixel portion and a driver circuit (source signal line driver circuit, gate signal line driver circuit) for driving the pixel portion. The driver circuits, memory and other circuits are inserted into portions between the buttons. The liquid crystal display device used in embodiment 12 is a transmission type or a reflection type liquid crystal display device.

Signals displayed in the liquid crystal display device 20400 can be recognized through the transparent buttons 10600. Signal information input to the electronic device by the buttons 10600 is displayed in the display portion 12000.

Note that it is possible to freely combine embodiment 12 with Embodiment Modes 1 and 2, and with Embodiments 1 to 11.

[Embodimen 13]

It is possible to use electronic devices of the present invention for many applications, and examples are explained in Embodiment 13.

Figure 40A:
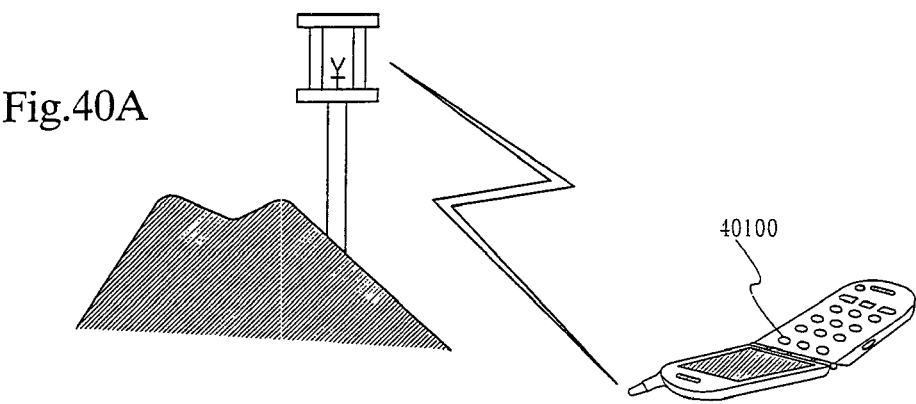
FIGS. 40A and 40B are diagrams for explaining an embodiment for using an electronic device of the present invention.
Figure 40B:
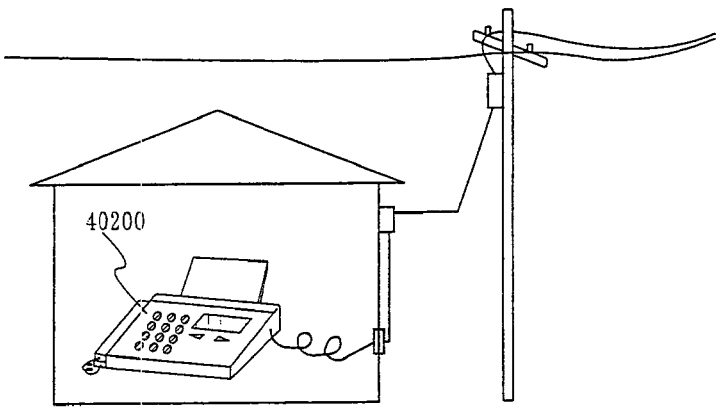

Information input from input keys and stored in a storage medium of an electronic device 40100 can be sent and received using a wireless transmission line, as shown in FIG. 40A. Further, information of a storage medium of an electronic device 40200 can similarly be sent and received by a telephone line with a hard wired connection, as shown in FIG. 40B. Conversely, the method of using an electronic device of the present invention can also be employed when reading out received information.

Figure 41:
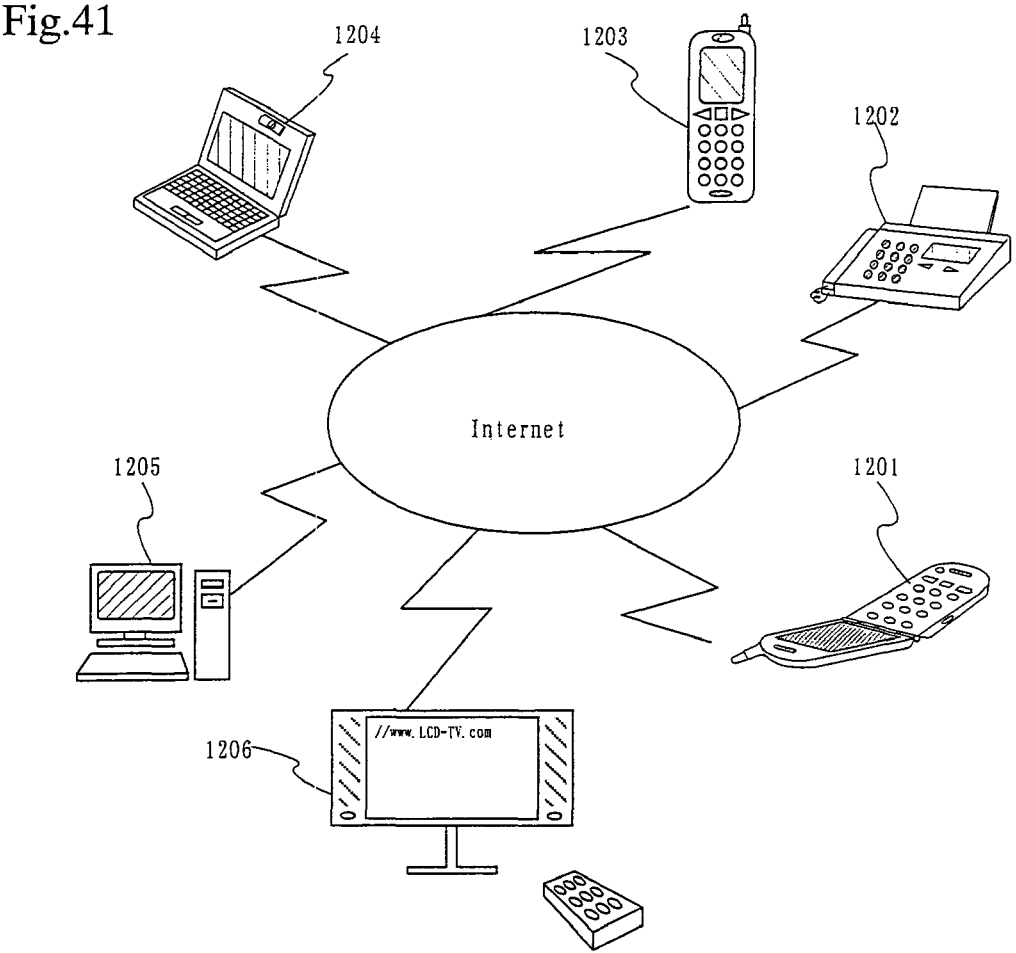
FIG. 41 is a diagram for explaining an embodiment for using an electronic device of the present invention.

Further, information can be sent to other electronic devices through the Internet, as shown in FIG. 41. Examples of electronic devices connected to the Internet include a portable telephone device 1201, a stationary telephone device 1202, a portable telephone device 1203, a portable personal computer 1204, a desk top personal computer 1205, and a television image receiving device 1204, as shown in FIG. 41. Other electronic devices may also be connected, of course. The input keys discussed in this specification are also formed in input means for the electronic devices connected to the Internet, and a similar method of use can be employed.

Figure 42A:
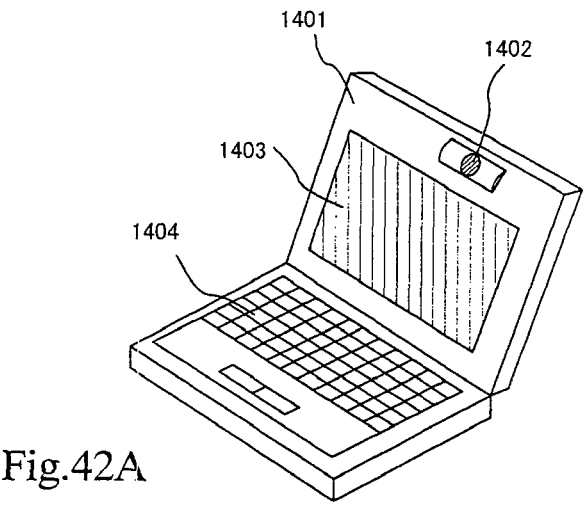
FIGS. 42A and 42B are diagrams for explaining an electronic equipment to which the present invention is capable of being applied.
Figure 42B:
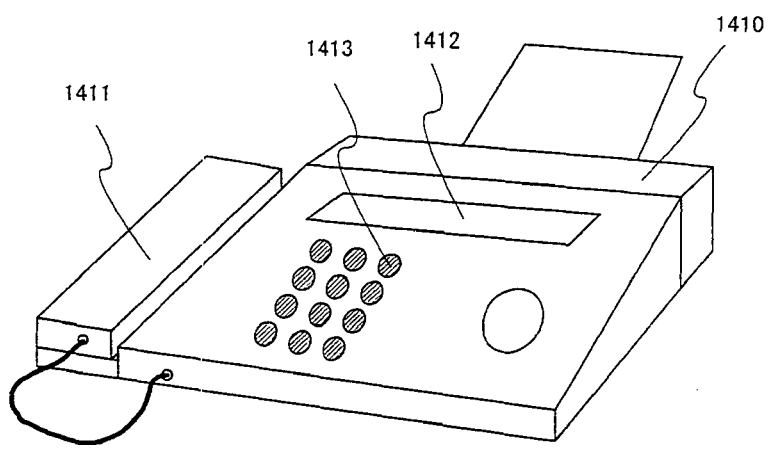

Further, the present invention can be applied to a notebook computer employing a display device shown in FIGS. 42A and 42B. The computer shown in FIG. 42A is provided with a main body 1401, a display device 1403 using a liquid crystal display device or an EL display device, an image input portion 1402, and a keyboard portion 1404. The present invention can be applied to the keyboard portion 1404. The keyboard portion in an electronic device that places importance on portability has limitations in key size and number of keys. By using the operation keys of the present invention, and giving each of the keys image display functions, input operations for data and the like can be enhanced.

A telephone device shown in FIG. 42B may have a facsimile function added, and is composed of elements such as a main body 1410, a receiver 1411, a display device 1412 for displaying telephone numbers and the like, and operation keys 1413. The present invention can be applied to the operation keys 1413, and enhancing input operations can also inerperformance the convenience of this type of stationary electronic device.

Examples of electronic devices employing the present invention are shown in FIGS. 42A and 42B, and the present invention can be applied to various electronic devices such as a keyboard of a desktop computer, remote control devices for television receivers or audio systems, selection buttons of automatic vending machines, and switches provided in control panels of various types of manufacturing devices.

Display devices are formed in operation keys for input of characters, symbols, numerals, and the like in electronic devices of the present invention. It is possible for a user to distinguish the operation keys by images such as characters, symbols, and numerals displayed by the display devices. It becomes possible to effectively utilize a limited number of operation keys in accordance with this structure, the operation keys can be made multi-functional, and user convenience can be inerperformance.

In addition, it is possible for the user to suitably change the direction of the electronic device and the direction of images such as characters, symbols, and numerals displayed in the operation keys by the display devices, thereby increasing the performance of operation of the electronic device.

In particular, in cases in which there are limitations on external dimension and on the input keys in devices such as portable electronic devices, the performance of use can be inerperformance remarkably. The aged who give complex operations a wide berth can also operate electronic devices without any fuss, provided that the present invention is used.

What is claimed is:

1. An electronic device comprising:
    a first frame;
    a first printed substrate over the first frame, the first printed substrate comprising a circuit;
    a second printed substrate over the first printed substrate, the second printed substrate comprising a wiring thereover;

a second frame over the second printed substrate;
a first transparent button passing through the second frame;
a first display device between the wiring and the first transparent button, the first display device being connected to the wiring;
a second transparent button passing through the second frame;
a second display device between the wiring and the second transparent button, the second display device being connected to the wiring;
a first diaphragm and a second diaphragm which are located between the first printed substrate and the second printed substrate and overlap with the first display device and the second display device, respectively;
a flexible printed circuit connecting the circuit with the wiring,
wherein the first display device is spaced from the second display device,
wherein the first transparent button is configured to move simultaneously with the first display device,
wherein the second transparent button is configured to move simultaneously with the second display device,
wherein the first transparent button and the first display device are configured to move independently from the second transparent button and the second display device, and
wherein the flexible printed circuit is interposed between the first frame and the second frame.

2. The electronic device according to claim 1, wherein the electronic device is a telephone.

3. The electronic device according to claim 1, wherein each of the first display device and the second display device comprises a plurality of pixels comprising EL elements.

4. The electronic device according to claim 3, wherein the EL elements contain triplet excitation compounds.

5. The electronic device according to claim 1, further comprising a controller and a memory,
wherein information of a signal input to the electronic device by the first transparent button and the second transparent button is read out from the memory in accordance with the controller, and
wherein the first display device and the second display device are configured to switch an orientation of the information displayed.

6. The electronic device according to claim 1, further comprising a controller and a memory,
wherein two types of information, in which an orientation of the information displayed differs, are stored in the memory; and
wherein the first display device and the second display device are configured to switch the orientation of the information displayed by reading out the two types of information from the memory in accordance with the controller.

7. The electronic device according to claim 1, wherein the electronic device is configured to switch an orientation of information displayed in the first display device and the second display device in response to an orientation of the electronic device.

8. The electronic device according to claim 1, wherein the first diaphragm and the second diaphragm each are conductive.

9. The electronic device according to claim 1, wherein the first display device and the second display device each are spaced from the second frame.

10. The electronic device according to claim 1, wherein the first transparent button and the second transparent button are in contact with the first display device and the second display device, respectively.

11. The electronic device according to claim 1, further comprising a flexible sheet which is interposed between the second printed substrate and the first diaphragm and between the second printed substrate and the second diaphragm.

* * * * *